United States Patent [19]

Chang et al.

[11] Patent Number: 5,319,779
[45] Date of Patent: Jun. 7, 1994

[54] SYSTEM FOR SEARCHING INFORMATION USING COMBINATORIAL SIGNATURE DERIVED FROM BITS SETS OF A BASE SIGNATURE

[75] Inventors: Walter W. Chang, San Jose, Calif.; Hans G. Schek, Wiesenbach, Fed. Rep. of Germany

[73] Assignee: International Business Machines Corporation, Armonk, N.Y.

[21] Appl. No.: 843,201

[22] Filed: Feb. 19, 1992

Related U.S. Application Data

[63] Continuation of Ser. No. 300,636, Jan. 23, 1989, abandoned.

[51] Int. Cl.$^5$ .................. G06F 15/40; G06F 15/411; H03M 7/30
[52] U.S. Cl. .................................... 395/600; 341/55; 341/60; 341/78; 341/79; 364/DIG. 1; 364/222.81; 364/222.82; 364/282.1; 364/282.2; 364/282.3; 364/283.1
[58] Field of Search .................. 364/DIG. 1, DIG. 2; 395/600, 400, 425; 341/50, 52, 51, 55, 56, 60, 78, 79

[56] References Cited

U.S. PATENT DOCUMENTS

| | | | |
|---|---|---|---|
| 4,118,788 | 10/1978 | Roberts | 395/600 |
| 4,677,550 | 6/1987 | Ferguson et al. | 395/600 |
| 4,817,036 | 3/1989 | Millett et al. | 395/600 |
| 4,841,433 | 6/1989 | Hakim et al. | 395/600 |
| 4,991,087 | 2/1991 | Burkowski et al. | 395/600 |

OTHER PUBLICATIONS

W. Litwin et al., A New Method for Fast Data Searches with Keys, IEEE Software, vol. 4, No. 2, Mar. 1987, pp. 16-24.

C. J. Guarin, Access by Content of Documents in an Office Information System, 11th International Conf. on Research & Dev. in Infor. Retrieval, Jun. 13, 1988, Grenoble, France, pp. 629-649.

R. Sacks-Davis et al., Multikey Access Methods Based on Superimposed Coding Techniques, ACM Transactions on Database Systems, vol. 12, No. 4, pp. 655-696, Dec. 1987.

(List continued on next page.)

Primary Examiner—Thomas C. Lee
Assistant Examiner—John C. Loomis
Attorney, Agent, or Firm—James C. Pintner

[57] ABSTRACT

This invention encodes information (such as the field values of a database record, or the words of a text document) so that the original information may be efficiently searched by a computer. An information object is encoded into a small "signature" or codeword using a method. A base or "leaf" signature S1 34 is computed by a known technique such as hashing. The logical intersection (AND) of each possible combination of pairs of bits of the base signature is computed, and the result is stored as one bit of a longer combinatorial signature CS1 42. The bit-wise logical union (bit-OR) of the combinatorial signatures of a group of records produces a second-level combinatorial signature CS2 52 representing particular field values present among those records. Higher-level combinatorial signatures CS3 60, CS4, etc. are computed similarly. These combinatorial signatures avoid a "saturation" problem which occurs when signatures are grouped together, and a "combinatorial error" problem which falsely indicates the existence of nonexistent records, thereby significantly improving the ability to reject data not relevant to a given query. When the combinatorial signatures are stored in a hierarchical data structure, such as a B-tree index of a database management system, they provide means for more efficiently searching database records or document text by eliminating large amounts of nonmatching data from further consideration.

9 Claims, 48 Drawing Sheets

COMBINATORIAL SIGNATURE COMPUTATION

OTHER PUBLICATIONS

Roberts, "Partial-Match Retrieval Via The Method of Super-Imposed Codes", Proceedings of the IEEE, vol. 67, No. 12, Dec. 1979, pp. 1624–1642.

Pfaltz et al., "Partial-Match Retrieval Using Indexed Descriptor Files", Communications of the ACM, Sep. 1980, vol. 23, No. 9, pp. 522–528.

Deppisch, "S-Tree: A Dynamic Balanced Signature Index for Office Retrieval" Proceedings of the 1986 ACM Conference, Sep. 8–10, 1986.

Harrison, "Implementation of the Substring Test by Hashing" Communications of the ACM, vol. 14, No. 12, Dec. 1971, pp. 777–779.

King et al., "Design of a Document Filing and Retrieval Service" IBM Research Report, Nov. 1982.

Dadam et al., "A Predicate Oriented Locking Approach for Integrated Information Systems" Information Processing 83, Sep. 19–23, 1983.

Goyal, "Coding Methods for Text String Search on Compressed Databases" Information Systems, vol. 8, No. 3, pp. 231, 233, 1983.

Faloutsos et al., "Optical Signature Extraction and Information Loss" ACM Transactions on Database Systems, vol. 12, No. 3, Sep. 1987, pp. 395–428.

Christodoulakis et al., "Design Considerations for a Message File Server", IEEE Transactions on Software Engineering, vol. SE-10, No. 2 Mar. 1984, pp. 201–209.

Faloutsos, "Signature Files: Design and Performance Comparison of Some Signature Extraction Methods" ACM, 1985, pp. 63–82.

Faloutsos, "Design of a Signature File Method that Accounts for Non-Uniform Occurrence and Query Frequencies" Proceedings of VLDB 85, pp. 165–170.

Sacks-Davis et al., "A Two-Level Superimposed Coding Scheme for Partial Match Retrieval" Information Systems, vol. 8, No. 4, pp. 273–280, 1983.

Schek, "The Reference String Indexing Method" Information Methodology, vol. 65, 1978, pp. 432–459.

```
100 sig_s1( input-data, output-signature )

/* loop initialization */
        /* (this is called the "current" field ) */
102     point to the first word or field of the input-data
104     object
        /* initialize S1 to empty signature */
106     set the output-signature to all zeros.

/* compute the signature by considering all fields */
108     DO-UNTIL (each field has been processed)
110     ]   point to the first substring in the current field
112     ]   DO-UNTIL (each substring of the field is processed)
114     ]   ]   compute the hash function for the current substring
116     ]   ]           of the current field
118     ]   ]   set the output-signature bit indicated by the hash
                    function
120     ]   ]   point to the next substring in the field
122     ]   END DO-UNTIL
124     ]   point to the next field
126     END DO-UNTIL
128     return the output-signature S1
```

SIG_S1 PSEUDOCODE

FIG. 1

```
200  sig_cs1( input-signature, output-signature )
           /* initialize the output signature CS1 */
202      set the output signature to all zeros /* set the "current" input bit */
204      point to the 1st bit position of the input signature /* set the "current" output bit */)
206      point to the 1st bit position of the output signature 208      DO-UNTIL (each bit of the input S1 signature
210      has been processed except the last one)
212      ]    test the current input signature bit
214      ]    initialize the start of the inner S1 loop
216      ]
218      ]    if the current input signature bit is set to 1
220      ]         beginning with the next bit
222      ]            DO-UNTIL (each remaining input signature bit is
                       tested)
224      ]    ]       compare the current input bit with the next
226      ]    ]       input signature bit
228      ]    ]       if the second (remaining) bit is 1
230      ]    ]          set the current output signature bit
                         position
232      ]    ]       otherwise
234      ]    ]          set the current output signature bit
                         position to 0
236      ]    ]       point to the next remaining input signature
                      bit position
238      ]    ]       point to the next output signature bit
                      position
240      ]            END DO_UNTIL (each of the remaining bits is
                      tested)
242      ]
244      ]    otherwise /* (if current input bit is 0) */
246      ]         skip over the next X output signature bit
                   positions
248      ]         /* (where X is the number of remaining input
                   signature */
250      ]         /* bits after the current input bit position) */
252      ]         set the next output signature bit position to
                   point to
254      ]         this bit position (old output bit position + X)
256      ]    point to the next input signature bit position
258      END DO-UNTIL
260  return the newly generated combinatorial signature
```

SIG_CS1 PSEUDOCODE

FIG. 2

```
300 sig_or( input-signature, output-signature, reset )

/* initialize the output signature CS2 */
302    if reset is TRUE
303       set the output signature to all zeros /* loop initialization */
304    point to the 1st bit position of the input signature
306    point to the 1st bit position of the output signature 308    DO-UNTIL (each bit of the input signature has been
           bit-ORed
310    ]     with the corresponding bit in the parent signature)
312    ]
314    ]     set the current output signature bit to
316    ]     the current output bit ORed with the current
318    ]     input bit
320    ]
322    ]     advance the current input  bit to the next bit
324    ]     advance the current output bit to the next bit
326    ]
328    END DO-UNTIL
330 return the updated parent combinatorial signature
```

SIG_OR PSEUDOCODE

FIG. 3

```
400 sig_and( query-signature, data-signature )

/* loop initialization: set "current" bit positions */
402    point to the 1st bit position of the query signature
403    and output signatures 404    set the result to TRUE /* assume everything matches */
406    DO-UNTIL (for each bit of the query and data signature)
408    ]  bit-AND the current query signature bit with the
410    ]  current data signature bit
412    ]  if result is not equal to the current query signature
          bit
414    ]     set result to FALSE
416    ]
418    ]  advance to the next query and data signature bit
          positions
420    ]  /* this is the new "current" position */
422    END DO-UNTIL
424 return the result
```

SIG_AND PSEUDOCODE

FIG. 4

```
500 sig_scan( query-record, output-record, root-page-pointer)
502   compute QS1  using procedure SIG_S1
504   compute QCS1 using procedure SIG_CS1

506   point to the first CS3 entry on the root page
      /* this is the current entry */
508   DO UNTIL (each root page (Parent-Key,CS3,Child-Page-ID) entry
510   ]   has been processed)
512   ]   compare the QCS1 signature against the current CS3
          signature
514   ]   if SIG_AND returns TRUE
516   ]       get the 2nd level B-tree page associated with the
              Child-Page-ID
518   ]       point to the first CS2 entry on the page
520   ]       /* this is the current entry */
522   ]
524   ]       DO UNTIL (each 2nd level page (Parent-Key,CS2,
              Child-Page-ID) entry
526   ]       ]        has been processed)
528   ]       ]   compare the QCS1 signature against the current CS2
                   signature
530   ]       ]   if SIG_AND returns TRUE
532   ]       ]       get the leaf level B-tree page associated with
                      the Child-Page-ID
534   ]       ]       point to the first S1 entry on the page
536   ]       ]       /* this is the current entry */
538   ]       ]
540   ]       ]       DO UNTIL (each 3nd leaf level (Key,S1,YID) entry
542   ]       ]       ]        has been processed
544   ]       ]       ]   compare the QS1 signature against the current
S1
546   ]       ]       ]   signature
548   ]       ]       ]   if SIG_AND returns TRUE
550   ]       ]       ]       access the record using TID
552   ]       ]       ]       compare the search terms against the
                              record fields
554   ]       ]       ]       if the search terms are found in the
                              record
556   ]       ]       ]           return the record
558   ]       ]       ]   advance to the next S1 entry on this page
560   ]       ]       END DO UNTIL
562   ]       ]
564   ]       ]   advance to the next CS2 entry on this page
566   ]       END DO UNTIL
568   ]
570   ]   advance to the next CS3 on the root page
572   END DO-UNTIL
574   return
```

SIG_SCAN PSEUDOCODE

FIG. 5

```
600  sig_insr( input-record, TID, root-page-pointer )
602      extract Key(s) from record /* standard B-tree operation */

604      call sig_s1 using input-record to compute signature S1
608      call sig_s1b using S1 to compute the combinatorial
             signature CS1

610      find the B-tree leaf page using the record key value for
612      S1 by using a standard B-tree search operation
614      while proceeding to the leaf level, bitwise-OR CS1 with
             the CS3,
616      CS2 signatures along the search path using SIG_OR.
618      when the leaf page is reached
620      check for enough page space to store the (Key, S1, TID)
             entry.
622      if there is no space
624          compute the new parent combinatorial group signatures
626              using the bitwise-OR method for each half of the page
                 being split.
628          perform a normal B-tree page split
630          propagate each new parent combinatorial to the original
                 parent page
632          insert the (Key,S1,TID) entry on the appropriate leaf
                 page 634      store the S1 signature and record TID in the B-tree page
             at the end of the path
```

SIG_INSR PSEUDOCODE

FIG. 6

```
700  sig_delt( input-record, TID, root-page-pointer )
702      construct a (Key,NULL,TID) entry for the B-tree search 724      find the B-tree leaf page and correct entry by using the
726      standard B-tree index search algorithm
728      delete the (Key,S1,TID) entry from the found leaf page
730      if it is the last entry
732          perform a standard B-tree page merge and delete the
734              parent combinatorial group signature in the parent
                 page
736              using a standard B-tree page merge operation
738          if parent page entry is the last one
740              merge this page with the next one and propagate the
742              delete to the parent level up to the root level.
```

SIG_DELT PSEUDOCODE

FIG. 7

HASHED SIGNATURE ( Chang, Engineer )

| Field | Substrings |
|---|---|
| Chang | <Cha>, <han>, <ang> |
| Engineer | <Eng>, <ngi>, <gin>, <ine>, <nee>, <eer> |

<Cha> = (2,7,0) weights are $256^{}2$, $256^{}1$, $256^{**}0$
<Cha> ⟶ (2 X 256 X 256) + (7 X 256) + (0) = 132864

| Substring | Value | Remainder after dividing by 7 |
|---|---|---|
| <Cha> | 132864 | 4 |
| <han> | 458765 | 6 |
| ⋮ | | |
| <Eng> | 265478 | 3 |
| <ngi> | 853512 | 2 |
| ⋮ | | |

S1 Signature: 0 0 1 1 1 0 1 0  — 34
bit position:  0 1 2 3 4 5 6 7

HASH CALCULATION

COMBINATORIAL SIGNATURE COMPUTATION

| Chang | Engineer | —40 |
| Haas | Manager | |
| Lapis | Programmer | |
| Lohman | Scientist | |
| Mohan | Scientist | |
| Schek | Scientist | |
| Wilms | Scientist | |
| Yost | Manager | —46 |

SAMPLE RECORDS

| Key | S1 | TID |
|---|---|---|
| Chang | 00111010 | T1D1 |
| Haas | 10111000 | T1D2 |
| Lapis | 10100100 | T1D3 |
| Lohman | 01010100 | T1D4 |
| Mohan | 10010100 | T1D5 |
| Schek | 01110100 | T1D6 |
| Wilms | 00110100 | T1D7 |

SINGLE LEAF PAGE

*FIG. 12*

48 — KEY | S1 (34) | TID
| KEY | S1 | TID |
|---|---|---|
| Chang | 00111010 | TID1 |
| Haas | 10111000 | TID2 |
| Lapis | 10100100 | TID3 |
| Lohman | 01010100 | TID4 |
| | ⋮ | |

50 —
| KEY | S1 | TID |
|---|---|---|
| Mohan | 10010100 | TID5 |
| Schek | 01110100 | TID6 |
| Wilms | 00110100 | TID7 |
| | | |
| | ⋮ | |

(Yost,10110000,TID8) is inserted here ⟶

TWO LEAF PAGES

*FIG. 13*

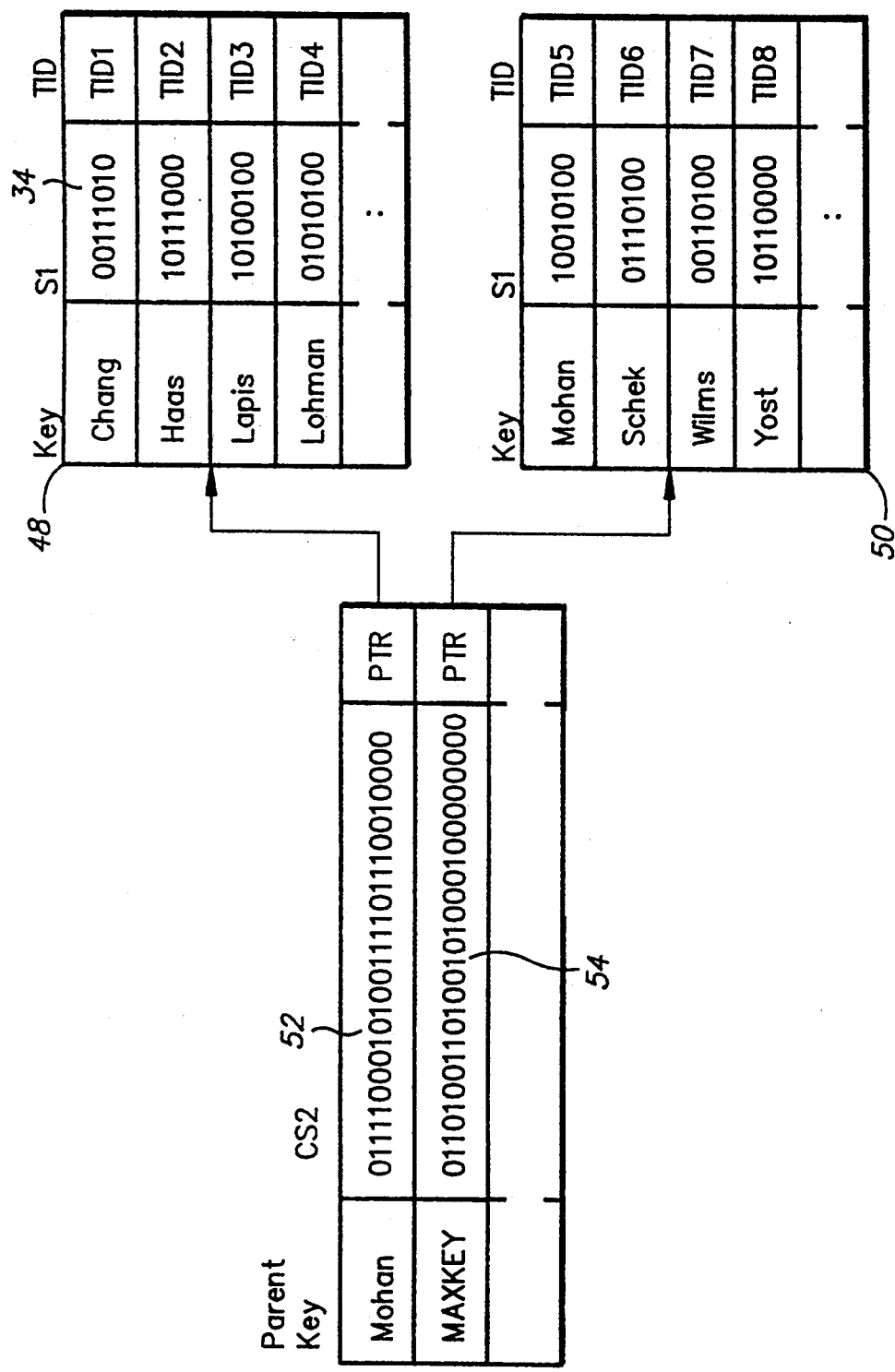
FIG. 14A  TWO-LEVEL COMBINATORIAL B-TREE

| Record Key | | S1 | Computer CS1 | |
|---|---|---|---|---|
| Chang | Engineer | 00111010 | 00000000000011010101010010000 | |
| Haas | Manager | 10111000 | 01110000000001100010000000000 | |
| Lapis | Programmer | 10100100 | 01001000000000001000000000000 | |
| Lohman | Scientist | 01010100 | 00000001010000000001000000000 | |
| | | | 01111000101001111011100010000 | CS2 for page 48 |
| Mohan | Scientist | 10010100 | 00101000000000000001000000000 | |
| Schek | Scientist | 01110100 | 00000011010010100010000000000 | |
| Wilms | Scientist | 10110000 | 00000000000001010001000000000 | |
| Yost | Manager | 10110000 | 01100000000001000000000000000 | |
| | | | 01101001101001010001000000000 | CS2 for page 50 |

TWO-LEVEL COMBINATION B-TREE

*FIG. 14B*

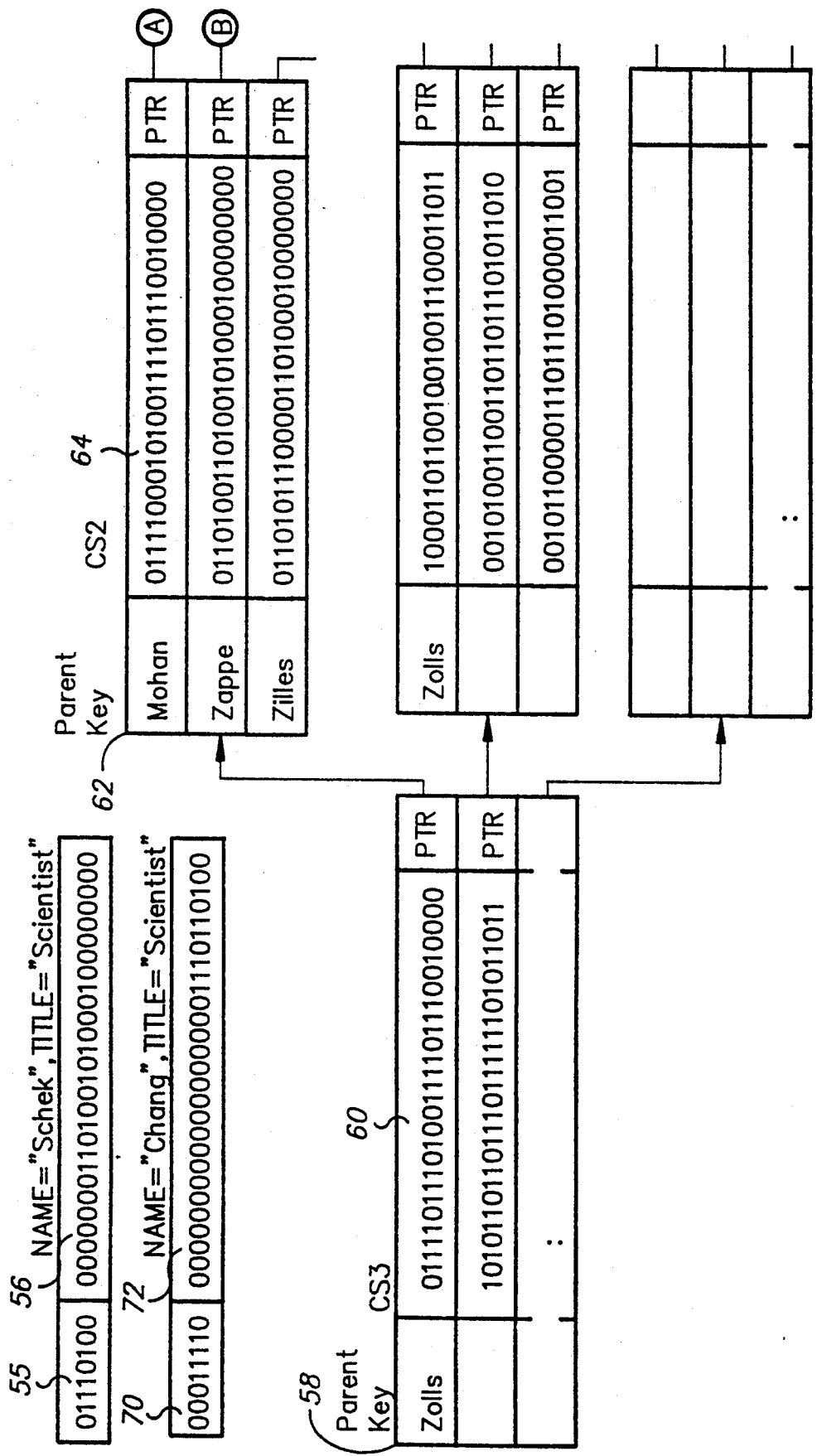
FIG. 15A  THREE-LEVEL COMBINATORIAL B-TREE

| 66 — Key | S1 | 34 | TID |
|---|---|---|---|
| Chang | 00111010 | | TID1 |
| Haas | 10111000 | | TID2 |
| Lapis | 10100100 | | TID3 |
| Lohman | 01010100 | | TID4 |
| | ⋮ | | |

(A) →

(B)

| Key | S1 | TID |
|---|---|---|
| Mohan | 10010100 | TID5 |
| Schek | 01110100 | TID6 |
| Wilms | 00110100 | TID7 |
| Yost | 10110000 | TID8 |
| | ⋮ | |

68 —

THREE-LEVEL COMBINATORIAL B-TREE

*FIG. 15B*

TWO-LEVEL SIGNATURE B-TREE

```
/* SIG_S1    C
/*
** generate short leaf Harrison signature for inprecp and put in
   page
** TID area of outrecp
*/
include <sys_cons.h>
include <tra_ctrl.h>
#include <tra_mac.h>
#include <tra_errs.h>
#include <pag_pag.h>
#include <pag_rec.h>
#include <isp_isp.h>
#include <bpm_bpm.h>
#include <sig_sig.h>
#include <ixm_ixm.h>
#include <ixm_im.h>

SINT sig_s1( sigp, siglen, inprecp )
        SIGNATUREP sigp;
        SINT    siglen;
        RECORDP inprecp;
{ SINT   rc;
  SINT   fieldno;
  SINT   fieldlen;
  char *field, *fcharp;

/*: TRA_ENTR(sig_s1, sigp,%81X,siglen,%d,inprecp,%81X); :*/
  rc = E_OK;
  /*
  ** compute field signatures for inprecp. later:
  ** expand sig_encd in-line, factor out length initializations
  */
  sig_encd( field,0, SIG_K1, SIG_M1, sigp, SIG_CLEAR );
  for (fieldno = 0; fieldno < inprecp->RECnflds; fieldno++)
      { field    = (char *) &(inprecp->RECflds[ inprecp->RECdir[
    fieldno ] ]);
        fieldlen = inprecp->RECdir[ fieldno + 1 ] -
        inprecp->RECdir[ fieldno ];
        fcharp = &(field[ fieldlen - 1 ]);
        while (*fcharp-- <= 4) fieldlen--;
        sig_encd( field, fieldlen, SIG_K1, SIG_M1, sigp,
        SIG_NOCLEAR );
      }

/*: TRA_EXIT(sig_s1,rc); :*/
  return(rc);
}
```

SIG_S1 SOURCE CODE

FIG. 17

```
/* SIG_S1B  C
/*  generate combinatorial signature S1b for inprecp record */
#include <sys_cons.h>
include <tra_ctrl.h>
#include <tra_mac.h>
#include <tra_errs.h>
#include <pag_pag.h>
#include <pag_rec.h>
#include <isp_isp.h>
#include <bpm_bpm.h>
#include <ixm_ixm.h>
#include <ixm_im.h>
#include <sig_sig.h>

SINT sig_s1b( sigp, siglen, inpsigp, clear )
        SIGNATUREP sigp;
        SINT       siglen;
        SIGNATUREP inpsigp;
        SINT       clear;
{ SINT   rc;
  SINT   basebit;
  SINT   bitpos;
  char  *field;
  SINT   i,j;
  SINT   ii;
  SINT   s1_i;
  SINT   tmp;
  RECORDP inprecp;
  SINT     fieldno;
  SINT     fieldlen;
  char    *fcharp;
```

SIG_S1B SOURCE CODE - PART A

FIG.18A

```
/*: TRA_ENTR(sig_s1b, sigp,%81X,siglen,%d,inpsigp,%1X,clear,%d);
:*/
if (clear)
sig_encd( field, 0, SIG_K2B, SIG_M2B, sigp, SIG_CLEAR );
for (i = 0; i < SIG_M1; i++)
   { s1_i = SIGGETB(inpsigp->SIGdata[i>>3],i & 0x7);
     if (s1_i)
        { basebit = (SIG_M1 * i) - (((i + 2) * ( i - 1)) >> 1 );
          ii = i + 1;
          for (j = ii; j < SIG_M1; j++)
             { if (s1_i && (tmp = SIGGETB(inpsigp->SIGdata[j>>3],j &
               0x7)))
                  { bitpos = basebit + (j ) - ii;
                    if (bitpos < SIG_M2B)
                    SIGSETB(sigp->sigdata[bitpos>>3],bitpos & 0x7);
                  }
             }
        }
   }
rc = E_OK;
/*: TRA_EXIT(sig_s1b,rc); :*/
return(rc);
}
```

SIG_S1B SOURCE CODE - PART B

FIG.18B

```
/* SIG_OR   C
/*
** routine for bit or'ing two signatures of not necessarily equal
length
** make this a macro later to improve performance
*/
SINT sig_or(sigp1, sigp2, sigp3)
   SIGNATUREP sigp1;                    /* src 1 */
   SIGNATUREP sigp2;                    /* src 2 */
   SIGNATUREP sigp3;                    /* dst   */
{ SINT siglen;
  unsigned char *sp1,*sp2,*sp3;
  sigp3->siglen = siglen = SIGMINL(sigp1,sigp2);
  sp1 = &(sigp1->sigdata[0]);
  sp2 = &(sigp2->sigdata[0]);
  sp3 = &(sigp3->sigdata[0]);

while (siglen--)
     *sp3++ = *sp1++ [ *sp2++;
  return(0);
}
```

SIG_OR SOURCE CODE
FIG. 19

```
/* SIG_COVR (SIG_AND)
** routine for testing if signature sigp1 (typically sig(q))
** covers another signature sigp2 (typically the sig(data object))
**
** returns 1 if sig1 covers sig2
**         0 if sig1 did not cover sig2
**         siglen is the number of signature bytes still left
**         to test when the mask test failed
*/

SINT sig_covr(sigp1,sigp2)
    SIGNATUREP sigp1;                    /* src 1 */
    SIGNATUREP sigp2;                    /* src 2 */
{ unsigned char *sp1,*sp2;
  SINT siglen;
  SINT rc;
  /*: TRA_ENTR(sig_covr,sigp1,%81X,sigp2,%81X); :*/
  sp1 = &(sigp1->sigdata[0]);
  sp2 = &(sigp2->sigdata[0]);
  if ((siglen = sigp1->SIGlen) != sigp2->SIGlen)
     { printf("sig_hash: inconsistent signature lengths: s1=%d s2=%d\n",
           sigp1->SIGlen, sigp2->SIGlen
        );
       rc = 0;
     }
```

SIG_COVR SOURCE CODE - PART A

FIG.20A

```
    else
     {while (((*sp1 & *sp2) == *sp1) && --siglen)
        { /*: TRA_DEVL(sig_covr,TRA_LVL1);
             printf("covr: (%2X&%2X= %2X) len=%3d\n",
                    *sp1 & 0xOFF, *sp2 & 0xOFF,
                   (*sp1 & *sp2) & 0xOFF, siglen
                   );
          :*/
          sp1++;
          sp2++;
        }
     rc = siglen == 0;
     /*: TRA_DEVL(sig_covr,TRA_LVL1);
     if (siglen)
     while (--siglen)
        { printf("covr:X(%2X&%2X= %2X) len=%3d\n",
                    *sp1 & 0xOFF, *sp2 & 0xOFF,
                   (*sp1 & *sp2) & 0xOFF, siglen
                   );
          sp1++;
          sp2++;
        }
     :*/
     }
  /*: TRA_EXIT(sig_covr,rc); :*/
  return(rc);
}
```

SIG_COVR SOURCE CODE - PART B
FIG.20B

```
/* SIG_SCAN C
/*
 *   index scan sig - recursively scans all child pages associated
 *     with the specified starting page
 *
 */
include <sys_cons.h>
#include <pag_pag.h>
#include <pag_rec.h>
#include <bpm_bpm.h>
#include <ixm_ixm.h>
#include <ixm_im.h>
#include <sig_sig.h>
#include <dms_cib.h>
#include <loc_loc.h>
#include <tra_ctrl.h>
#include <tra_mac.h>
#include <tra_errs.h>
#include <vrm_vsm.h>
include <win_disp.h> define BUFFSIZE 1024
define PROJSIZE 512
#define PFIXSIZE 256

SINT sig_scan( cibp, page_id, dcbp, recfldsp )
      CIBP     cibp;       /* relevant scan control block */
      TID      page_id;    /* the     TID of the root page */
      DISPCBP  dcbp;
      RECFLDS  *recfldsp;
{ SINT      rc, rc1;
  TID       tid[ 512 ];                 /* normal TIDs and IRM TIDs   */
  char      projbuff[ BUFFSIZE ];  /* warning: must 4 byte align */
  char      buffer[ BUFFSIZE ];    /* warning: must 4 byte align */
  char      prefix[ PFIXSIZE ];
  PAGEP     pagep;
  RECORDP   recordp;
  SINT      nflds;
  SINT      recno;
  SINT      tidoff;
  SINT      endoff;
  TID       cpag_id;      /* the     TID of a  child page */
```

SIG_SCAN SOURCE CODE - PART A

FIG.21A

```
BPMDBSID   dbsid;
BPMDBSID   reldbsid;
RECORDP    fullrecp;
RECORDP    projrecp;
SINT       i,j;
char       *tidp;
SIGSCANID  sigscanid;
SIGNATUREP sig1qp;
SIGNATUREP sig1p;
SIGNATUREP sig2ap;
SIGNATUREP sig2bp;
SIGNATUREP sigq1p;
SIGNATUREP sigq2ap;
SIGNATUREP sigq2bp;
VSMDESCP   stmdescp;              /* pointer to the stor meth desc */
SINT       sig_rcmp();
/* prefix management */
RECORDP prevrp;
SINT       prevpfix;
SINT       recpfix;
SINT       s2a, s2b;
char       *reccp;
char       *prevcp;
IXMSCANID scanid;                 /* relevant scan control block */

SINT    size;                     /* signature statistics */
SINT    qw;
SINT    lpag;
SINT    ppag;
SINT    slr;
SINT    s2ar;
SINT    s2br;
SINT    s2abr;
SINT    hits;
SINT    fds;
SINT    tas;
```

SIG_SCAN SOURCE CODE - PART B

FIG.21B

```c
/*: TRA_ENTR(sig_scan,cibp,%1X,page_id,%1dd,dcbp,
    %81X,recfldsp,%81X); :*/
rc    = E_OK;
lpag  = 0;
ppag  = 0;
s1r   = 0;
s2ar  = 0;
s2br  = 0;
s2abr = 0;
hits  = 0;
fds   = 0;
tas   = 0;

scanid    = (IXMSCANID) *(cibp->cibsidlp);
fullrecp  = (RECORDP) &(buffer[0]);
projrecp  = (RECORDP) &(projbuff[0]);
tidp      = (char *) &(tid[0].TIDpage);
dbsid     = scanid->IXMdbsid;
sigscanid = (SIGSCANID) scanid;
siglqp    = (SIGNATUREP) &(sigscanid->SIGs1[0]);
qw = sig_hamw( siglqp );
if (rc = bpm_fix( dbsid, page_id, BPM_READ, &pagep) )
  { tra_push(E_RESIG1,"sig_scan",10,"failed to fix specified
    page");
    goto exit;
  }

/*
** handle appropriate case
** parent node
*/
if (pagep->PAGilvls >= 2)
  { ppag = 1;
    for (recno = 0; recno < pagep->PAGndir; recno++)
      { recordp = (RECORDP) &(pagep->PAGrecs[ pagep->PAGdir[
        recno ] ]);
        sig2ap   = (SIGNATUREP)
            &(recordp->RECflds[CEIL2(recordp->RECdir[
            recordp->RECnflds - 4])]);
        sig2bp   = (SIGNATUREP)
            &(recordp->RECflds[CEIL2(recordp->RECdir[
            recordp->RECnflds - 3])]);

s2a = sig_covr(sigq2ap = (SIGNATUREP)
           &(sigscanid->SIGs2a[0]),sig2ap);
        s2b = sig_covr(sigq2bp = (SIGNATUREP)
           &(sigscanid->SIGs2b[0]),sig2bp);
```

SIG_SCAN SOURCE CODE - PART C

FIG.21C

```
    /*: TRA_DEVL(sig_scan,TRA_LVL2);
        s2a = 1;
    :*/
    /*: TRA_DEVL(sig_scan,TRA_LVL3);
        s2b = 1;
    :*/
    s2ar += (!s2a);
    s2br += (!s2b);

/*: TRA_DEVL(sig_scan,TRA_INTA);
    printf("a=%s b=%s %2d %3ld:%3d\n",
            (s2a) ? "p" : "f" ,
            (s2b) ? "p" : "f" ,
            pagep->PAGilvls,
            pagep->PAGnumb,
            recno);
    :*/
    if (s2a && s2b)
       {if (rc = ixm_rgpg( recordp, &cpag_id ))
          { tra_push(E_RESIG1,"sig_scan",20,"failed to get
            child TID");
            goto exit;
          }
        if (rc = sig_scan( cibp, cpag_id, dcbp, recfldsp ))
          { tra_push(E_RESIG1,"sig_scan",30,"failed to scan
            child page");
            goto exit;
          }
       }
    else
       { s2abr++;
         /*: TRA_DEVL(sig_scan,TRA_INTA);
             printf("sig_scan: QUERY S2A\n");
             sig_ssho( sigq2ap );
             printf("sig_scan: PAGE  S2A\n");
             sig_ssho( sig2ap );
             printf("sig_scan: QUERY S2B\n");
             sig_ssho( sigq2bp );
             printf("sig_scan: PAGE  S2B\n");
             sig_ssho( sig2bp );
         :*/
       }
  }
}
```

SIG_SCAN SOURCE CODE - PART D

FIG.21D

```
    else
/*
** leaf node
*/
  { prevrp  = (RECORDP) &(pagep->PAGrecs[ pagep->PAGdir[0] ]);
    lpag = 1;
    nflds = pagep->PAGndir - ((TSTBIT(pagep->PAGiflgs,IXMRMOST))
    ? 1 : 0);

for (recno = 1; recno < nflds; recno++)
      { recordp  = (RECORDP) &(pagep->PAGrecs[
        pagep->PAGdir[ recno ] ]);
        prevpfix = prevrp->RECpfix;
        recpfix  = recordp->RECpfix;
        prevcp   = (char *) &(prevrp->RECflds[ prevrp->RECdir[
          0 ]]);
        reccp    = (char *) &(recordp->RECflds[
        recordp->RECdir[ 0 ]]);
        if (prevpfix < recpfix)
          for (i = prevpfix; i < recpfix; i++)
            prefix[ i ] = prevcp[ i - prevpfix ];
        prevrp = recordp;

siglp = (SIGNATUREP) SIG_S1_ADDR(recordp);
        if (sig_covr(&(sigscanid->SIGs1[0]),siglp))
          { rc = ixm_rget( pagep, recno, prefix, fullrecp );
            tidoff = fullrecp->RECdir[ fullrecp->RECnflds - 1 ];
            endoff = fullrecp->RECdir[ fullrecp->RECnflds     ];

stmdescp = (VSMDESC *)
            &(RECFIELD(cibp->cibreldp,0));
            reldbsid = stmdescp->vsmdbs;

cibp->ciblowp = &(tidp[0]);
            size = endoff - tidoff;
            for (i = 0; i < size; i++)
              tidp[ i ] = fullrecp->RECflds[ tidoff + i ];

/*: TRA_DEVL(sig_scan,TRA_INTA);
              dms_shod( cibp->cibreldp );
              printf("L=%2d %4ld:%4d tup=%4d:%8lX\n",
                pagep->PAGilvls,
                pagep->PAGnumb,
                recno,
                reldbsid,* (LINT *) tidp);
              pag_rsho(fullrecp, RECDATA);
            :*/
```

SIG_SCAN SOURCE CODE - PART E

FIG.21E

```
                    cibp->cibfldsp = NULL;
                    cibp->cibrecl  = BUFFSIZE;
                    cibp->cibrecp  = fullrecp;
                    if ((* (LINT *) &(tidp[0])) == 0L)
                      { tas++;
                      }
                    else
                    if ((rc = dms_fet( cibp )) == E_OK)
                       { tas++;
                         if (sig_rcmp(scanid->IXMstart, cibp->cibrecp)
                            == EQUAL)
                             {/*: TRA_DEVL(sig_scan,TRA_INTA);
                               pag_rsho( cibp->cibrecp, RECDATA );
                              :*/

/*: TRA_DEVL(sig_scan,TRA_LVL1);
                                if (E_OK != (rc = pag_prj( fullrecp,
                                recfldsp, projrecp,
                                     (SINT) 512, NULL, tidp, (SINT)
                                     sizeof(TID) )))
                                  { tra_push(E_RESIG1,"sig_scan",04,
                                     "pag_prj err:TID=%1Xx &TID=%1Xx",
                                     *tidp, tidp );
                                    printf("sig_scan: project failure
                                    rc=%d\n",rc);
                                  }
                                  win_disp( tidp, projrecp, recfldsp,
                                    dcbp, rc );
                               :*/ hits++;
                              }
                          else
                             fds++;
                          }
                      cibp->cibrecl = 0;
                      cibp->cibrecp = (RECORDP) NULL;
                      }
                    else
                       slr++;
                 }
          }
    exit:
        if (bpm_ufix( pagep, BPM_NOLV ))
           { rc = rc1;
             tra_push(E_RESIG1,"sig_scan",34,"unfix failed");
           }
        sig_stat( 'A', qw, 1, ppag, lpag, slr, s2ar, s2br, s2abr, tas,
        fds, hits, 0L);
        /*: TRA_EXIT(sig_scan,rc); :*/
        return( rc );
    }
```

SIG_SCAN SOURCE CODE - PART F

FIG.21F

```
/* IXM_LFIN C
/*
 * ixm_lfin -    leaf page insert: take uncompressed key, locate
 *               correct part., locate correct slot in partition,
 *               insert key into page, then update pbsd. this
 *               routine derived from ixm_pins() and Mohan's
 *               pseudocode. for the signature prototype, key
 *               entries also will contain the short S1 signature.
 *               since ixm_rins() contains logic to determine if
 *               sufficient space is on the page and may do a
 *               pag_rorg(), ixm_lfin() will try to lock and latch
 *               the page first, then carry out the insert if the
 *               insert fails, a split is needed and the page is
 *               unlatched.
 *            1) the search (ixm_ploc()) is bypassed for the empty
 *               page case here an empty pbsd is inserted and then
 *               the key is inserted
 *            2) a split can occur only after ixm_rins() returns
 *               E_NOROOM
 *            3) for the root case, we copy the root to a new
 *               page, use the normal split routine, connect the
 *               new page to it, then call ixm_srch() all over
 *               agin with the key to be inserted
 *            4) if a split has occurred, the key returned is the
 *               new split key in expanded form. otherwise the key
 *               is unchanged
 *
 *               Logging occurs in the following way:
 *                  do  : the insert action is logged
 *                  undo: the undo action is called using the
 *                        logged key record. the necessary
 *                        compensation record is then written. the
 *                        insert is undone by using a logical page-
 *                        level delete
 *                  redo: do actions performed as each log record
 *                        is scanned. when compensation record is
 *                        encountered, redo the compensation action
 *
 *               Here, when inserts (deletes) are local to the
 *               page (i.e., splits do not occur and propagate
 *               up), we perform a local "logical" undo action.
 *
 *               The undo of a delete will be an insert action
 *               which may or may not cause an undo page re-
 *               partitioning. If do re-partitions use unreserved
 *               free space, the undo of insert will be a key
 *               delete action which could go ahead an perform the
 *               re-partition
```

IXM_LFIN SOURCE CODE - PART A

FIG. 22A

```
#include <sys_cons.h>
include <tra_ctrl.h>
#include <tra_mac.h>
#include <tra_errs.h>
#include <pag_pag.h>
#include <pag_rec.h>
#include <isp_isp.h>
#include <bpm_bpm.h>
#include <ixm_ixm.h>
#include <ixm_im.h>
#include <trn_trn.h>
#include <env_loc.h>
#include <loc_loc.h>
#include <clg_clg.h>
#include <log_rtyp.h>

SINT ixm_lfin( pageid, bufp, inpkey, outkey, insparm, dummy )
   TID     pageid;
   PAGEP   bufp;
   RECORDP inpkey;
   RECORDP *outkey;
   char    *insparm;
   TID     dummy;
{
   char    rbuf[ RECPFIX ];      /* record buffer */
   RECORDP pbsd;                 /* prefix binary search directory */
   RECORDP succrec;              /* successor of new record */
   RECORDP highkey;              /* highkey for rightmost leafpage */
   RECORDP splitkey;             /* page split key record */
   IXMPBSDF  pbsdfld;            /* an IXMPBSDF structurE */
   IXMPBSDF *pbsdfldp;           /* pointer to a IXMPBSDF structure */
   SINT    partno;               /* pbsd slot  (start of partition) */
   SINT    partrecid;            /* relative record number in part. */
   SINT    recno;                /* compressed key page dir slot */
   SINT    partsize;             /* size of search partition */
   SINT    newpfix;              /* size of new prefix after insert*/
   SINT    iresult;              /* ixm_comp difference between target
                                    and last <= compressed key */
   SINT    field;                /* field number within pbsd record */
   SINT    rc, rcl;              /* return code */
   SINT    succpfix;             /* prefix length of successor*/
   SINT    pbsdnfld;             /* will hold pbsd->RECnflds */
   SINT    succprec;             /* next recid(1st recid,next part) */
   SINT    i,j;                  /* prefix array index */
   SINT    npbsdlen;             /* length of new pbsd */
   LSN     pag_lsn;              /* page do-lsn state */
   LOCNAME lname;                /* for building the lock name */
   SINT    nuniqfld;             /* unique   fields in key */
   SINT    norigfld;             /* original fields in key */
```

IXM_LFIN SOURCE CODE - PART B

FIG. 22B

```
    PAGEP    bufp1;                  /* new left page in root split */
    PAGEP    bufp2;                  /* new rght page in root split */
    BPMDBSID dbsid;                  /* extracted db space id */
    RECBLDM (bldspc,1);              /* record build spec for
                                        empty page */

SINT     ixm_logi();

struct
      { char   nfields;
        char   fldn[2];
      } proj;

/*: TRA_ENTR(ixm_lfin, pageid, %81X, bufp, %81X,
                            inpkey, %81X, *outkey, %81X,
                            insparm,%81X, dummy, %81X); :*/
retry:

#if TRA_SANE
  if (bufp == NULL)
    { tra_push(rc = E_BADTYP,"ixm_lfin",0,"Page pointer was
      NULL");
      goto exit;
    } if (
        ( inpkey->RECnflds - ( TSTBIT(bufp->PAGiflgs,IXMSIGN) ?
        2 : 0 ) ) != ( bufp->PAGifmax    + (
        TSTBIT(bufp->PAGiflgs,IXMATTSM)? 1 : 0 ) )
     )
    { char emsg[ 100 ];
      sprintf(emsg,"dbs=%d page=%ldd key-nflds=%d !=
      pag-nflds=%d",
                    bufp->PAGdbs,    bufp->PAGnumb,
                    inpkey->RECnflds,bufp->PAGifmax
             );
      tra_push(rc = E_2MANY,"ixm_lfin",3, emsg );
      goto exit;
    } if (!(bufp->PAGtype & PAGINDXL))
    { tra_push(rc = E_BADTYP,"ixm_lfin",5,"Page was not
      leaf pagetype");
      goto exit;
    }
endif rc = E_OK;
```

IXM_LFIN SOURCE CODE - PART C

FIG. 22C

```
/*
** we remember our own lsn
*/
LSNCOPY( bufp->PAGlsn, pag_lsn );
dbsid = bufp->PAGdbs;

/*========================================================
**
** general case:    locate where key should go, check key unique
                    violation, put key into page, update PBSD if
                    necessary. the page will have at least a
                    pbsd and maxhigh key if it is brand new
*/

/*
** If unique index, look up key only (not incl. tid).
** If not found by ixm_ploc, then state is correct for ixm_rins.
** If found, then a key already exists with these nuniqflds
*/ if (TSTBIT(bufp->PAGiflgs,IXMSIGN))
   {inpkey->RECnflds -= 2;
   } if (nuniqfld = bufp->PAGiufld)
   { norigfld = inpkey->RECnflds;
     inpkey->RECnflds = nuniqfld;
   }
rc = ixm_ploc(bufp, inpkey, &recno, &newpfix,
              &(pbsdfld.ixmpfix[0]), &iresult,
              &partno, &partsize, &partrecid );

if (nuniqfld)
   inpkey->RECnflds = norigfld;

if (TSTBIT(bufp->PAGiflgs,IXMSIGN))
   {inpkey->RECnflds += 2;
   } if ( rc == E_OK )
   { /*
     ** duplicate key (if uniq) or duplicate tid error
     */
     if ( nuniqfld )
        rc = E_FOUND;
     else
        rc = E_BADNEWS;
     tra_push(rc,"ixm_lfin",40, "Duplicate key");
```

IXM_LFIN SOURCE CODE - PART D

```
        /*
        ** go unfix this page since caller expects page unfixed on
        return */
        goto exit;
      }
    else if (rc == E_NFOUND)
      { /*
        ** key not found as expected - pop last error record
        ** to see other bulk load errors while debugging
        */
        /* tra_rstx(); */
           tra_pop();
      }
    else
      { /*
        ** special conditions: if the page contains only a maxkey
           value rc will = E_2MANY but the insert should be carried
           out anyway.  nflds code is present now for sanity
           checking only since we have no other real keys for
           reference on this page we assume that the provided key
           is valid
        */
        if (rc == E_2MANY)
          {highkey = (RECORDP) &(bufp->PAGrecs[ bufp->PAGdir[ 1 ]
           ]);
           if ((bufp->PAGnrecs == 2) && IM_ISMAX(highkey))
             { rc    = E_OK;
               recno = IXMFIRST;
             }
          }
        else
          { tra_push(E_RESIG1,"ixm_lfin",50,"ixm_ploc()
            unexpected error.");
            goto exit;
          }
      }
  }

/* key: set key->RECpfix to len common to key and predecessor */
/* &recno: set to recid on page of where new key will go */
/* &newpfix: set to len common to key and successor */
/* &pbsdfld.ixmpfix[0]: set to key prefix of successor */
/* &iresult: set to result of ixm_comp between key and
   successor */
/* &partno: set to the pbsd entry giving 1st recid of
   partition */
/* &partsize: set to current number of keys in partition */ if (partno == -1) /* when ixm_ploc detects that inserted key */
    partno = 0;   /* is before 1st partition */
```

IXM_LFIN SOURCE CODE - PART E

FIG. 22E

```
/*
** capture successor record data here before it changes and also
   this way we don't have to re-compute it. if the next pbsd key
   is prefix to successor record, succpfix is current length of
   pbsd key
*/
if (recno < bufp->PAGnrecs)
   { succrec  = (RECORDP) &(bufp->PAGrecs[ bufp->PAGdir[ recno ]
     ]);
     succpfix = succrec->RECpfix;
   }
else
   succpfix = 0;
/*
** try and x lock partition, x latch the page, check for lsn
   consistency. we perform lock testing here to see if someone
   else has changed the page
*/
if ((rc = ixm_lock(pageid,bufp,
                   LOCTPBSD,LOC_LNGC,LOC_LNGU,
                   partno,pag_lsn,"ixm_lfin") ) == E_BADLSN )
   { tra_pop();   /* pop error record telling about E_BADLSN */
     goto retry;
   }
else if (rc != E_OK)
   { /*
     ** means either a deadlock or some bpm_fix or bpm_ufix
        failure
     */
     tra_push(E_RESIG1,"ixm_lfin",10,"X lock, X latch or bpm
     failure");
     goto exit;
   }
```

IXM_LFIN SOURCE CODE - PART F

FIG. 22F

```
if (rc = ixm_rins(bufp,inpkey,recno -
1,newpfix,&(pbsdfld.ixmpfix[0])))
   { if (rc == E_NOROOM)
        { tra_pop();
          /* -----------------------------
          ** time to split the root page
          */
          if (bufp->PAGtype & PAGINDXR)
             {/*
               ** do necessary latching and locking with ixm_lock()
                  call
               */
               if ((rc = ixm_lock(pageid,bufp,
                                  LOCTIPAG,LOC_LNGC,LOC_LNGU,
                                  partno,pag_lsn,"ixm_lfin") ) ==
                                  E_BADLSN )
                 { tra_pop();   /* pop error record telling about
                                   E_BADLSN */
                   goto retry;
                 }
               else if (rc != E_OK)
                  { /*
                    ** means either a deadlock or bpm_fix or
                       bpm_ufix error
                    */
                    tra_push(E_RESIG1,"ixm_lfin",60,"ixm_lock X lock,
                    X latch or bpm failure");
                    goto exit;
                  } if (rc = ixm_splr( dbsid, bufp, &bufp1, &bufp2 ))
                  { tra_push(E_RESIG1,"ixm_lfin",65,"root split
                    error");
                    goto exit;
                  }
               /*
               ** bufp1 and bufp2 pages
               ** chained together by ixm_splt (called by ixm_splr)
               */
```

IXM_LFIN SOURCE CODE - PART G

FIG. 22G

```
         /*
         ** now insert the key which caused the split
         */
         rc = ixm_srch(
                 dbsid,       /* db space id                */
                 pageid,      /*    TID of root page        */
                 NULL,        /*    TID of parent page      */
                 NULL,        /* BPM ptr to parent page     */
                 pageid,      /*    TID of child page       */
                 0,           /* target height              */
                 0,           /* current height             */
                 inpkey,      /* insert original key        */
                 outkey,      /* insert original key        */
                 ixm_lfin,    /* action routine address     */
                 BPM_WRIT,    /* bpm latch fixmode          */
                 LOC_IX,      /* lock manager lockmode      */
                 LOCTIPAG,    /* lock manager locktype      */
                 insparm);    /* scan list head             */ goto exit2;
      }
/*----------------------------------------
** time to split the non-root page
*/
else
   {/*
    ** do necessary latching and locking by calling
       ixm_lock()
    */
    if ((rc = ixm_lock(pageid,bufp,
                       LOCTIPAG,LOC_LNGC,LOC_LNGU,
                       partno,pag_lsn,"ixm_lfin") ) ==
                       E_BADLSN )
    { tra_pop();  /* pop error record telling about
                     E_BADLSN */
      goto retry;
    }
    else if (rc != E_OK)
      { /*
         **   means either a deadlock or bpm_fix or
             bpm_ufix error
         */
         tra_push(E_RESIG1,"ixm_lfin",68,
                  "ixm_lock X lock, X latch or bpm
                   failure");
         goto exit;
      }
```

IXM_LFIN SOURCE CODE - PART H

FIG. 22H

```
            if (rc = ixm_splt( dbsid, bufp, &bufp1, &splitkey ))
              { tra_push(E_RESIG1,"ixm_lfin",70,"non-leaf split
                error");
                goto exit;
              }
            else
              { rc = E_SRCHPIN;
                outkey = splitkey; /* return new split key */
                /*
                **  bufp and bufp1 pages
                **  chained together by ixm_splt
                */
                goto exit;
              }
          }
        }
      else
        tra_push(E_RESIG1,"ixm_lfin",80,"Ixm_rins failure:
        no insert.");
        goto exit;
    }
  else
     { *outkey = (RECORDP) NULL;

}
  /*
  ** ixm_rins() succeeded: continue with pbsd fixup
  */

/*
  ** establish addressability to pbsd here since it may have
  ** moved due to page reorganization during ixm_rins
  */
pbsd = (RECORDP) &(bufp->PAGrecs[ bufp->PAGdir[ IXMRPBSD ] ]);
pbsdnfld = pbsd->RECnflds;
/*
** fix pbsd entries to reflect new page dir numbers
*/
succprec = (-1);
for (field = pbsdnfld - 1; field > partno; field--)
   { pbsdfldp = (IXMPBSDF *) &(pbsd->recflds[ pbsd->RECdir[
     field ] ]);
     succprec = pbsdfldp->ixmpslot++;
   }

/*
** now check to see if successor is 1st key of next search
   partition
*/
```

IXM_LFIN SOURCE CODE - PART I

FIG. 22I

```
/*
** is recno of succ key after new key the same as recno of 1st
   key in succ partition? if so, check to see if the this succ
   pbsd prefix key needs to grow. (i.e., prefix of new key is
   bigger than old succ prefix. the successor prefix cannot
   shrink due to an insert)
*/ if ((recno == succprec) && (newpfix > succpfix))
  { /*
    ** key record contains extra bytes compressed out of next
       key. append bytes from position succpfix to newpfix in
       prefix
    */ for (i = succpfix; i < newpfix; i++)
      pbsdfld.ixmpfix[ i ] = inpkey->recflds[ inpkey->RECdir[
        0 ] + i ];

pbsdfld.ixmpslot = recno + 1;
    npbsdlen = pbsd->RECdir[ pbsdnfld ] + newpfix - succpfix;

proj.nfields = 1;
    proj.fldn[0] = partno + 1;
    bldspc.recnflds = 1;
    bldspc.recfspc[0].recfldp = (char *) &pbsdfld.ixmpslot;
    bldspc.recfspc[0].recflen = newpfix + sizeof(IXMRECID);
    pag_rbld( &bldspc, rbuf, sizeof(rbuf) );
    pag_pupd( bufp, rbuf, &proj, IXMRPBSD );

}
/*----------------------------------------------------------
**
** at this point, key has been inserted, pbsd has been adjusted.
   now need to log the insert and possibly invalidate index
   scans
**
**            -----log data-----      -----new LSN-----
** rc = ixm_logi( pageid, bufp, inpkey, ..., &(bufp->PAGlsn) );
** rc = ixm_tscn( pageid, bufp, inpkey, partno, recno, ...
        insparm );
**
** use physical manager to log, ixm_tscn to invalidate.
*/
if (dbsid > 0 && ixm_logd)
    if (rc = ixm_logi(dbsid,pageid,inpkey,bufp,RTYPixm_lfin))
      { tra_push(E_RESIG1,"ixm_lfin",85,"ixm_logi failed.");
        goto exit;
      }
```

IXM_LFIN SOURCE CODE - PART J

FIG. 22J

```
/*
** partsize is the old partition size. after the insert, the
   partsize is actually one smaller, thus we check to see if the
   old partsize is equal to or bigger than the partition key
   count max
*/
if (partsize >= ixm_pmax)
   {if (rc = ixm_rbal( bufp ))
      {if (rc == E_NOROOM)
         { tra_pop();
           rc = E_OK;
           /*
           ** mark page to indicate rebalancing is needed
           */
           SETBIT(bufp->PAGiflgs,IXMRBALF);
         }
       else
         { tra_push(E_RESIG1,"ixm_lfin",90,"Ixm_rbal failed.");
         }
       goto exit;
      }
   }
exit:

/*
 * unfix this page: remember that rc might need to be set to
                    E_SRCHPIN
 */
if (rc1 = bpm_ufix( bufp, BPM_NOLV ))
   { tra_push(E_RESIG1,"ixm_lfin",100,"Cannot unfix page");
     rc = rc1;
   } exit2:
/*
 * exit here since prior ixm_srch() call has already unfixed
   page
 */
/*: TRA_EXIT(ixm_lfin,rc,*outkey,%81X); :*/
return( rc );
}
```

IXM_LFIN SOURCE CODE - PART K

FIG. 22K

```
/* IXM_LFDE C
/*
 * ixm_lfde -    leaf page delete: take uncompressed key, locate
 *               correct slot and partition, delete from page.
 *
 *               locate correct slot in partition, delete key from
 *               page, then update pbsd.  this routine is derived
 *               from ixm_pdel().
 *
 *          1)   the search (ixm_ploc()) is bypassed for a page
 *               with 1 data key here the key and the pbsd record
 *               is deleted
 *
 *          2)   we signal a parent delete if the leaf page is
 *               empty by E_SRCHPDE
 *
 *          3)   for the root case, leave the empty root page and
 *               single child alone.
 */ define IXMNOREBAL 1       /* no rebalance on threshhold violation
*/ include <sys_cons.h>
include <tra_ctrl.h>
#include <tra_mac.h>
#include <tra_errs.h>
#include <pag_pag.h>
#include <pag_rec.h>
#include <isp_isp.h>
#include <bpm_bpm.h>
#include <ixm_ixm.h>
#include <ixm_im.h>
#include <log_rtyp.h>
#include <clg_clg.h>
#include <loc_loc.h>
#include <trn_trn.h>
#include <env_loc.h>

SINT ixm_lfde( pageid, bufp, inpkey, outkey, scanlist, dummy )
   TID        pageid;
   PAGEP      bufp;
   RECORDP    inpkey;
   RECORDP    *outkey;
   IXMSCANID  scanlist;
   char       *dummy;
```

IXM_LFDE SOURCE CODE -PART A

FIG. 23A

```
{
    RECORDP    pbsd;            /* prefix binary search director */
    RECORDP    succrec;         /* successor of new record */
    RECORDP    splitkey;        /* page split key record */
    RECORDP    deltrec;         /* pointer to deleted key record */
    SINT       deltpart;        /* deleted key's partition number */
    IXMPBSDF   pbsdfld;         /* an IXMPBSDF structure */
    IXMPBSDF   *pbsdfldp;       /* pointer to IXMPBSDF structure */
    IXMPBSDF   *pbsdfp;         /* pointer to IXMPBSDF structure */
    SINT       partno;          /* pbsd slot (start of partition) */
    SINT       recno;           /* compressed key page dir slot */
    SINT       deltprec;        /* slot of deleted key predecessor*/
    SINT       partsize;        /* size of search partition */
    SINT       partrecn;        /* relative recordid in partition    */
    SINT       oldpfix;         /* size of old prefix after delete   */
    SINT       iresult;         /* ixm_comp difference between       */
                                /* target and last <= compressed key */
    SINT       field;           /* field number within pbsd record   */
    SINT       rc, rc1;         /* return code                       */
    SINT       succpfix;        /* prefix length of successor        */
    SINT       pbsdnfld;        /* will hold pbsd->RECnflds          */
    SINT       succprec;        /* next recid (1st recid, next part) */
    SINT       i,j;             /* prefix array index                */
    SINT       npbsdlen;        /* length of new pbsd                */
    LSN        pag_lsn;         /* page do-lsn state                 */
    LOCNAME    lname;           /* for building the lock name        */
    char       *rbuf;           /* record buffer                     */
    char       *prefix;         /* pointer to compressed key prefix  */
    IID        iid;             /* identifier of index               */
    BPMDBSID   dbsid;           /* extracted db space id             */
    IXMSCANID  scanid;          /* id of scan cb in scanlist         */
    SINT       posdiff;         /* position where compared keys differ */
    RECBLDM (bldspc, 1);        /* 1 field record build spec         */
    SINT       bytesdel;        /* number of bytes deleted from page */
    SINT       pagetype;        /* flag indicating page type         */
    SINT       ixm_lgde();      /* routine to log delete             */
    SINT       ixm_prde();
    SINT       ixm_ploc();
    SINT       ixm_rdel();
    SINT       ixm_uspl();
    SINT       pag_fdel();
    SINT       pag_fupd();
    SINT       pag_del();
    SINT       partdist;
    SINT       posdist;
    struct
      { char    nfields;
        char    fldn[2];
      } proj;
```

IXM_LFDE SOURCE CODE -PART B

FIG. 23B

```
  /*: TRA_ENTR(ixm_lfde, pageid, %1X, bufp, %1X,
        inpkey, %1X, *outkey, %81X, scanlist, %1X, dummy, %81d);
:*/ retry:
  if (bufp == NULL)
    { rc = E_BADTYP;
      tra_push(E_RESIG1,"ixm_lfde",0,"Page pointer was NULL");
      goto exit;
    } if (!((pagetype = bufp->PAGtype) & PAGINDXL))
    { rc = E_BADTYP;
      tra_push(rc,"ixm_lfde",05,"Page was not leaf pagetype");
      goto exit;
    }
  rc = E_OK;

/*
   * save our own do-lsn from page
   */
  LSNCOPY( bufp->PAGlsn, pag_lsn );
  dbsid   = bufp->PAGdbs;
  iid     = bufp->PAGiid;
  /*
   * find the key on the page and make sure it matches
   */
  rc = ixm_ploc(bufp, inpkey, &recno, &succpfix,
        &pbsdfld.ixmpfix[0], &iresult, &partno,   &partsize,
        &partrecn );
  /*
  ** inpkey:  set inpkey->RECpfix to len  common  to  key  and
               predecessor
  ** &recno:  set to      recid on page of target recid if found
  ** &succpfix: set to len common to key and successor
  ** &pbsdfld.ixmpfix[0]: set to newpfix bytes of key prefix
  ** &iresult: set to result of ixm_comp between key and successor
  ** &partno:  set to the pbsd entry giving 1st recid of partition
  ** &partsize: set to current number of keys in partition
  */
  deltrec = (RECORDP) &(bufp->PAGrecs[ bufp->PAGdir[ recno ] ]);
```

IXM_LFDE SOURCE CODE -PART C
FIG. 23C

```
if (TSTBIT(bufp->PAGiflgs,IXMATTSM))
   { if (deltrec->RECnflds != inpkey->RECnflds)
      { /* unexpected error */
        tra_push(E_RESIG1,"ixm_lfde",7,"wrong RECnflds in
        caller att key");
        rc = E_NFOUND;
        goto exit;
      }
   }
else if (bufp->PAGiufld != inpkey->RECnflds)
      { /* unexpected error */
        tra_push(E_RESIG1,"ixm_lfde",8,"wrong RECnflds in
        caller stm key");
        rc = E_NFOUND;
        goto exit;
      }

/*================================================================
**
** case 1: the leaf page will go empty and maybe propagate a
          delete upwards
**
**    (1)  ixm_ploc has checked that target key matches page key
**    (2)  copy the next page onto this one if this one is not
         rightmost
**    (3)  fix up parent page by deleting parent key if this
         one is not rightmost
*/
if (bufp->PAGnrecs == 2) /* 2 records: a pbsd and key rec */
   { if (iresult != EQUAL [[ rc != E_OK)
       { tra_push(E_RESIG1,"ixm_lfde",10,"detected
         ixm_ploc error");
         goto exit;
       }

/*
     * ixm_lock will try to x lock and x latch the page. we
     first test for (conditional lock) X lock long the
     partition, then unconditionally X lock long the
     partition, latch the page X, then test for consistent
     parent do-lsn state.
     *
     */
    partno = 0;
    if ((rc = ixm_lock(pageid,bufp,
                LOCTPBSD,LOC_LNGC,LOC_LNGU,
                partno,pag_lsn,"ixm_lfde")) == E_BADLSN)
       { tra_pop();/* pop error record telling about E_BADLSN */
         goto retry;
       }
```

IXM_LFDE SOURCE CODE -PART D

FIG. 23D

```
    else if (rc != E_OK)
      { /*
        *   means either a deadlock or some bpm_fix or
            bpm_ufix failure
        */
        tra_push(E_RESIG1,"ixm_lfde",20,"X lock, X latch or
        bpm failure");
        goto exit;
      }

/*
     * this page will go empty: un-split this page with next
       right page
     *
     * copy next page to this page (unless this is rightmost
       page) but do not copy the BPM specific PAGHDR and PAGEND
       from the next page
     *
     * use ixm_uspl()
     * if rc == E_NFOUND:  there was no right sibling page (ok)
     *    rc == E_SRCHPDE: the un-splitting was successful (ok)
     *                     and we signal the delete upwards
     *    rc == E_BADTYPE: the page and its right sibiling are
     *                     of different types
     *    rc == E_RESIG1:  some other unexpected problem
     */
    if ((rc = ixm_uspl( bufp )) == E_SRCHPDE)
      { /*
        **    get the first key of this page (was 1st key of
              next page).  this is done so ixm_prde() will be
              able to locate the parent of this just copied
              page to fix up the child pointer from parent
        */

*outkey = (RECORDP) LOC_ALLOC((LINT)
         sizeof(TID)+PAGRECLEN(bufp,IXMFIRST), "ixmlfde0");

if (*outkey != NULL)   /* sanity max size key sanity
                                        check */
          /* use dummy since record 0 has no prefix */
          if (ixm_rget( bufp, IXMFIRST, dummy, *outkey) )
            { tra_push(rc = E_RESIG1,
                "ixm_lfde",20,"detected ixm_rget failure");
            }
          else
            { /* ixm_fix_up_the_scan_control_block(s) */
              /* stuff page and logical partition          */
              /* number and recno into record              */
              ixm_rxpg( *outkey, sizeof( TID) );
              ixm_rspg( *outkey, 0L);
            }
```

IXM_LFDE SOURCE CODE -PART E

FIG. 23E

```
            else
              tra_push( rc = E_RESIG1, "ixm_lfde", 25, "no space
              for key" );
              /* will goto exit */
          }
      else if (rc == E_NFOUND)
         { tra_pop();
           /*
            *.                \
            *      this is the rightmost leaf page of an index.
                  since we cannot copy next right child page we
                  delete the keys by re-formatting the page
            */
           /* call log manager to log changes */ if (dbsid > 0)
                if (rc = ixm_lgde(dbsid,pageid,inpkey,bufp,
                RTYPixm_lfde))
                    { tra_push(E_RESIG1,"ixm_lfde",27,
                      "ixm_lgde failed.");
                      goto exit;
                    } pag_intp( bufp, pagetype );
           rc = E_OK; /* do not signal parent delete action */
           /* will goto exit */
         }
      else
         { /*
            * means something bad and unexpected happened during
              un-split
            */
           tra_push(E_RESIG1,"ixm_lfde",30,"ixm_uspl
           error detected");
           /* will goto exit */
         }
      goto exit;
    }
else /*================================================================
**
**
** case 2: the leaf page did not go empty. here, we have
         already located the key so all we do is delete it
         and update the pbsd if necessary (this is the
         general case)
```

IXM_LFDE SOURCE CODE -PART F

FIG. 23F

```
**
**          logic is included to perform rebalancing is a
            partition gets smaller than the minimum partition
            size threshhold.  various arguments exist for
            deferring this rebalance and letting a later insert
            trigger it but the logic is included to symmetry to
            ixm_lfin()
*/
    { if (rc == E_NFOUND)
        { tra_push(E_RESIG1,"ixm_lfde",30,"delete key not found");
          goto exit;
        }
      else if (rc != E_OK)
        { /* unexpected error */
          tra_push(E_RESIG1,"ixm_lfde",40,"unexpected error from
          ixm_ploc");
          goto exit;
        } succrec  = (RECORDP) &(bufp->PAGrecs[ bufp->PAGdir[
      recno+1 ] ]);
      oldpfix  = deltrec->RECpfix;

if (rc = ixm_rdel(bufp,recno))
        { tra_push(E_RESIG1,"ixm_lfde",
                 50,"detected ixm_rdel failure: no delete");
          goto exit;
        }
         if (dbsid > 0)
            if (rc = ixm_lgde(dbsid,pageid,inpkey,bufp,
            RTYPixm_lfde))
              { tra_push(E_RESIG1,"ixm_lfde",27,
                "ixm_lgde failed.");
                goto exit;
              } if IXMNOREBAL
     /*
     ** establish addressability to pbsd
     ** since it may have moved due to a pag_rorg
     */
     pbsd = (RECORDP) &(bufp->PAGrecs[ bufp->PAGdir[ IXMRPBSD ]
     ]);
     pbsdnfld = pbsd->RECnflds;
     /*
     **  recid of 1st key in partition
     */
     deltprec = (pbsd->recflds[ pbsd->RECdir[ partno ] ]);
     succprec = 0;
```

IXM_LFDE SOURCE CODE -PART G

FIG. 23G

```
/*
** fix pbsd entries to reflect new page dir numbers, find
   successor
*/
for (field = pbsdnfld - 1; field > partno; field--)
  { pbsdfldp = (IXMPBSDF*) &(pbsd->RECflds[ pbsd->RECdir[
    field ] ]);
    succprec = --(pbsdfldp->ixmpslot);
  } if (recno == deltprec)
    { /*
      ** case #1: deleted key is start of partition number
                  partno
      */
      succpfix = succrec->RECpfix;
      deltpart = 0;
      if (recno > IXMFIRST)
        deltpart = partno;
      else if (partno < (pbsd->RECnflds - 1) && recno ==
      succprec)
        deltpart = partno + 1;

if (deltpart > 0)
        { if (rc = pag_fdel( pbsd, deltpart, &bytesdel ))
            { tra_push(E_RESIG1,"ixm_lfde",60,"Bad PBSD
          Partition No. to Delete");
              goto exit;
            }
          bufp->PAGfree = bufp->PAGfree + bytesdel;
          /*
          **    Not necessary to reserve space liberated in
                PBSD because later rebalance will be
                deferred if insufficient (unreserved) space
                is available.
          */
        }
    }
  else if (recno == succprec)
    {/*
      ** case #2: successor of deleted key is start of next
         partition
      */
      if (succpfix > oldpfix)
        { /*
          *    key record contains extra bytes compressed
               out of next key append bytes from position
               pbsdplen to newpfix in prefix
          */
```

IXM_LFDE SOURCE CODE -PART H

FIG. 23H

```
              npbsdlen = pbsd->RECdir[ pbsdnfld ] - succpfix +
              oldpfix;
              /*
              rc = pag_fupd( pbsd, partno + 1, oldpfix +
              sizeof(IXMRECID),
                         &pbsd->RECflds[ pbsd->RECdir[ partno
                         + 1 ]],
                         npbsdlen, newpbsd );
              */
              pbsdfldp = (IXMPBSDF*) &pbsd->RECflds[
              pbsd->RECdir[partno + 1]];

proj.nfields = 1;
              proj.fldn[0] = partno + 1;
              bldspc.recnflds = 1;
              bldspc.recfspc[0].recfldp = (char *)
              &pbsdfldp->ixmpslot;
              bldspc.recfspc[0].recflen = oldpfix +
  sizeof(IXMRECID);
              rbuf = LOC_ALLOC( (LINT) RECPFIX, "ixmlfdeR" );
              if (rc = pag_rbld( &bldspc, rbuf, RECPFIX ))
                 { tra_push(E_RESIG1,"ixm_lfde",90,"bad bld rec");
                   goto exit;
                 }
              if (rc = pag_pupd( bufp, rbuf, &proj, IXMRPBSD ))
                 { tra_push(E_RESIG1,"ixm_lfde",100,"bad pupd
                   operation");
                   goto exit;
                 }
              LOC_FREE( rbuf );
            }
         }
else
         /*
         ** partsize is the new partition size. after the delete,
            partsize is actually one smaller, thus we check to see
            if the new partsize is equal to or less than the
            partition key count minimum
         */
         if (partsize >= ixmpmin)
            {if (rc = ixm_rbal( bufp ))
               {if (rc == E_NOROOM)
                  { tra_pop();
                    rc = E_OK;
                    /*
                    ** mark page to indicate rebalancing is needed
                    */
                    SETBIT(bufp->PAGiflgs,IXMRBALF);
                  }
```

IXM_LFDE SOURCE CODE -PART I

FIG. 23I

```
              else
              { tra_push(E_RESIG1,"ixm_lfde",90,"Ixm_rbal
                  failed.");
              }
              goto exit;
              }
          }
endif
      }
    exit:

/*
     * unfix this page: remember that rc might be set to E_SRCHPIN
     */
    if (bpm_ufix( bufp, BPM_NOLV ))
        tra_push(E_RESIG1,"ixm_lfde",120,"Cannot unfix page");

/*: TRA_EXIT(ixm_lfde,rc); :*/
    return( rc );
}
```

IXM_LFDE SOURCE CODE -PART J

FIG. 23J

```
/* IXM_SRCH C
 * index level search routine
 *
 *
  *
   *
    *
     ** check if we need to do signature processing
     */ if (TSTBIT(cbufp->PAGiflgs,IXMSIGN))
      { if ((action == ixm_lkup) && TSTBIT(
        scanp->IXMstype,SIGSIGN))
         { /* update signature scan cb level info */
           SIGSCANID sigscanid;
           sigscanid = (SIGSCANID) scanp;
             { sigscanid->SIGslot[ cbufp->PAGilvls ] =
               ncrecno;
               sigscanid->SIGptid[ cbufp->PAGilvls
               ].TIDpage = cbufp->PAGn
               sigscanid->SIGnlvls++;
             }
         }
        else
        if ((action == ixm_lfin) && (cbufp->PAGilvls
        >= 2))
         { /* superimpose signatures into parent key */
           SIGNATUREP srcp, dstp;
           SINT i;
           srcp = (SIGNATUREP) SIGFIELD(inpkey,
           inpkey->RECnflds - 2);
           dstp = (SIGNATUREP) SIGFIELD(ncrp,
           ncrp->RECnflds - 4);

if (rc = bpm_fix( dbsid,
                             cbufp->PAGnumb,
                             BPM_OLD [ BPM_WRIT, &cbufp))
              { errrc = E_RESIG1;
                errtag = 23;
                errmsg = "Can't fix parent page X";
                goto errexit;
              }
           for (i = 0; i < srcp->SIGlen; i++)
              { dstp->SIGdata[i] [= srcp->SIGdata[i];
              }
           srcp = (SIGNATUREP) SIGFIELD(inpkey,
           inpkey->RECnflds - 1);
           dstp = (SIGNATUREP) SIGFIELD(ncrp,ncrp->RECnflds
           - 3);
```

IXM_SRCH SOURCE CODE - PART A

FIG. 24A

```
              for (i = 0; i < srcp->SIGlen; i++)
               { dstp->SIGdata[i] [= srcp->SIGdata[i];
               }
              if (rc = bpm_ufix( cbufp, BPM_LOVE ))
                 { errrc   = E_RESIG1;
                   errtag = 24;
                   errmsg = "Can't unlatch child page";
                   goto errexit;
                 }
             }
            }
           *
          *
         *
        *
       *
      *
     *
goto exit;
errexit:
   tra_push( errrc,"ixm_srch",errtag,errmsg );

exit:
/*: TRA_EXIT(ixm_srch,rc,outkey,%81X,*outkey,%81X); :*/
   return( rc );
}
```

IXM_SRCH SOURCE CODE - PART B

FIG. 24B

SYSTEM FOR SEARCHING INFORMATION USING COMBINATORIAL SIGNATURE DERIVED FROM BITS SETS OF A BASE SIGNATURE

This is a continuation of copending application Ser. No. 07/300,636 filed on Jan. 23, 1989, now abandoned.

BACKGROUND OF THE INVENTION

1. Technical Field

This invention relates to computerized data processing, and more particularly to structures and methods for storing and searching data using encoded signatures representing that data.

2. Description of the Prior Art

Methods for coding and organizing data to allow for faster searching are important to information systems. Signature coding is one such method. To understand the problems solved by this invention, we begin by explaining the signature generation or encoding process. We will use the term "record" to indicate a generic data object such as a database record or a text fragment within a document.

The actual encoding process consists of computing a short signature S1 containing only 1's and 0's for each record. Various known "hashing" techniques may be used for generating these signatures, and will not be discussed in detail. The resulting signature for each record is usually much smaller than the original record. The signature and identifier of the record (called a TID) are stored on "pages" for later retrieval. A page is a fixed sized unit of storage which can contain key and signature data and may be in memory or on disk.

To locate a record or text fragment containing one or more values, a signature is computed from the search terms by using the same encoding process. This "query" signature is then compared against the stored signatures. When the stored signature contains a 1 bit in each position in which there is a 1 bit in the query signature, the record associated with the signature is identified as potentially satisfying the query. The TID stored with the signature is then used to retrieve the record. The data fields in the record (or words in the text fragment) are precisely matched against the search values using a conventional string compare algorithm to determine if a match has occurred. Records which satisfy the precise match conditions are then returned to the user.

To accommodate large numbers of records, "parent" signatures are computed for "groups" of records. Higher level (e.g., grandparent) signatures are organized similarly for groups of lower-level signatures. These signatures can then be organized into a hierarchical (multi-level) file structure. One well-known method for computing a new parent signature is to superimpose or "bit-OR" a group of individual signatures. A query signature is then compared to this parent signature first before it is compared to individual signatures. If a 1 bit occurs in any position of the query signature without a corresponding 1 in the patent signature, the entire group of lower-level (child) signatures and their associated records need not be accessed for further examination. This process allows a parent signature to filter out a large number of non-matching signatures and records.

Unfortunately, when this technique is used, both saturation and combinatorial errors occur. As more signatures are superimposed into the parent signature, more bits are set to 1. At some point, saturation occurs and the parent signature contains all 1's. The parent signature then becomes useless, because it will match any query signature and never be rejected. Since several methods are known to control this saturation problem, it will not be discussed in detail.

The second problem is that since the bits of a signature represent fields of the original records, the parent signature represents not only all existing individual records, but also nonexistent "virtual" records which appear to contain data formed by combining values from among the records in the group represented by the parent. These virtual records do not exist in the data, but are falsely indicated as existing by the parent signature. For example, assume records contain simple last name, title field pairs (Chang, Engineer), (Schek, Scientist), (Yost, Manager), and (Lohman, Scientist). Signatures for these might be (00111010), (01110100), (10110000), and (01010100). A parent signature (11111110) formed by bit-ORing these four signatures would correctly indicate the presence of the above records, but would also incorrectly indicate the presence of non-existent virtual records (Chang, Scientist), (Schek, Manager), (Yost, Engineer), etc.

The saturation and combinatorial error effects caused by using the superimposed method of grouping signatures results in records being unnecessarily accessed. Unnecessary accesses of records are also called "data false drops". When a parent signature causes a set of child signatures to be accessed unnecessarily, this is called a "signature false drop".

Parent signatures indicate a superset of records over which an exact test must be performed. Ideally, the size of this set should match the size of the correct answer set (i.e., no false drops.) Due to imperfections in hashing, and because of various saturation and combinatorial effects, this is not the case. Thus, the number of data and signature false drops is a crucial indicator of the effectiveness of any such coding scheme in eliminating non-matching records from further consideration. Several different multi-level signature organizations have already been investigated by Roberts (1979), Pfaltz (1980), Deppisch (1986), Sacks-Davis (1987), and others in attempts to solve these problems.

Pfaltz documents a multi-level signature organization using a sparse signature encoding scheme. Signatures with a low ratio of 1's to 0's are bit-OR'ed to form group signatures. While this helps the saturation problem, a combinatorial error remains. Queries composed of combinations of record values from the same group result in unnecessary accesses of record signatures. In addition to this combinatorial error, the sparse encoding scheme by Pfaltz results in an inefficient use of the signature space.

Roberts first proposed and implemented a signature storage method which minimized the combinatorial error effect by using a bit-sliced architecture. In this approach, signatures logically form rows in a matrix, and are physically stored by bit columns. When a query is processed, positions in the query signature where 1's occur indicate which columns in the matrix should be accessed and examined. The major disadvantage of this method is the high cost of updates and deletions. Since the storage for each bit column is determined by the total number of rows, the storage and update requirements for each column can be tremendous.

Sacks-Davis have devised a multi-level block approach improving on the bit-sliced architecture first proposed by Roberts. In this approach, bit-sliced parent "block" signatures are used to reduce saturation. However, the combinatorial error problem is not solved. Furthermore, in environments where updates are frequent update costs of this approach are on the order of several dozen to over a hundred page accesses per signature insert, which is unacceptably high.

Deppisch has developed a multi-level method wherein leaf signatures are clustered by similarity of bit patterns. Signatures exhibit slightly less sensitivity to the combinatorial error effect due to the use of significantly larger data and query signatures. This method has two distinct disadvantages. First, more storage space is required for the larger signatures. Second, significantly more computation is required for the clustering algorithm.

SUMMARY OF THE INVENTION

This invention comprises a method for encoding a signature representing a record of two or more data items. The first step computes a base signature representing at least two of the record's data items, preferably by hashing. Next, a combinatorial signature having more bits than the base signature is initialized. Bits of the combinatorial signature correspond to respective sets of two or more bits of the base signature. The final step assigns values to bits of the combinatorial signature based on one or more logical operations on the bits of the respective set of the base signature corresponding to the combinatorial signature's bit being assigned a value.

The invention further comprises an improved hierarchical data structure in which combinatorial signatures are stored, and an improved method for searching such a data structure which includes the step of rejecting groups of data without reading such data where the group's respective combinatorial signature indicates that no data of the group matches the criteria of the search.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a pseudocode implementation of the procedure SIG_S1 for generating leaf signatures.

FIG. 2 is a pseudocode implementation of the procedure SIG_CS1 for generating combinatorial signatures according to the preferred embodiment.

FIG. 3 is a pseudocode implementation of the procedure SIG_OR for generating second- and higher-level combinatorial signatures.

FIG. 4 is a pseudocode implementation of the procedure SIG_AND for comparing combinatorial signatures.

FIG. 5 is a pseudocode implementation of the procedure SIG_SCAN for scanning a B-tree containing combinatorial signatures according to the preferred embodiment.

FIG. 6 is a pseudocode implementation of the procedure SIG_INSR for inserting a new record into a B-tree containing combinatorial signatures according to the preferred embodiment.

FIG. 7 is a pseudocode implementation of the procedure SIG_DELT for deleting a record from a B-tree containing combinatorial signatures according to the preferred embodiment.

FIG. 12 shows a single B-tree leaf page including base or "leaf" signatures for the first seven records of FIG. 11.

FIG. 13 shows the single page of FIG. 12 split into two leaf pages during the insertion of the eighth record of FIG. 11.

FIGS. 14A and 14B show a two-level combinatorial B-tree according to the preferred embodiment, containing the leaf pages of FIG. 13.

FIGS. 15A and 15B a three-level combinatorial B-tree according to the preferred embodiment, containing the leaf pages of FIG. 13.

FIG. 17 is an implementation in the C programming language of the base signature generation procedure SIG_S1 of the preferred embodiment of the invention.

FIGS. 18A and 18B are an implementation in the C programming language of the preferred combinatorial signature generation procedure, here named SIG_S1B.

FIG. 19 is an implementation in the C programming language of the preferred higher-level signature generation procedure SIG_OR.

FIGS. 20A and 20B are an implementation in the C programming language of the preferred combinatorial signature comparison procedure, here named SIG_COVR.

FIGS. 21A, 21B, 21C, 21D, 21E and 21F are an implementation in the C programming language of the preferred procedure SIG_SCAN for scanning a B-tree containing combinatorial signatures.

FIGS. 22A, 22B, 22C, 22D, 22E, 22F, 22G, 22H, 22I, 22J and 22K are an implementation in the C programming language of the preferred procedure, here named SIG_LFIN, for inserting a new record into a B-tree containing combinatorial signatures.

FIGS. 23A, 23B, 23C, 23D, 23E, 23F, 23G, 23H, 23I and 23J are an implementation in the C programming language of the preferred procedure, here named SIG_LFDE, for deleting a record from a B-tree containing combinatorial signatures.

FIGS. 24A and 24B are an implementation in the C programming language of the preferred procedure, here named SIG_SRCH, for searching for a matching record in a B-tree containing combinatorial signatures.

DESCRIPTION OF THE PREFERRED EMBODIMENT

Overview

Figures 8, 9:
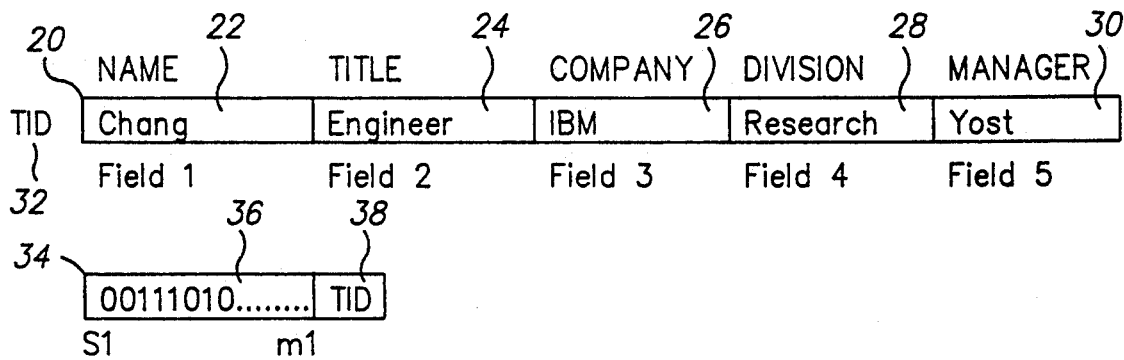
FIG. 8 shows a sample data record and its hashed leaf signature according to the preferred embodiment.
FIG. 9 shows the computation of the hashed leaf signature of FIG. 8 according to the preferred embodiment.

The central idea of this invention is the use of a new signature function that encodes combinations of values rather than single values from a record, i.e., that computes a new signature based on some combination of multiple bits from the original record signature. A signature at the lowest level will be called a "base signature", or in B-tree terminology a "leaf signature". A signature of any higher level will be called a "parent signature" or a non-leaf signature. For any data record, S1 will designate a base or leaf signature and CS1 will designate a corresponding first-level combinatorial signature. CS2, CS3, and CS4 will designate the higher level combinatorial signatures for the second, third, and fourth levels.

Each leaf page will hold a group of S1 leaf signatures. The first-level combinatorial signatures CS1 for these records are computed as needed to create second-level combinatorial parent signatures CS2, but will not be stored. Each non-leaf page holds a set of these parent combinatorial signatures. The second level combinatorial signatures CS2 on a non-leaf page themselves form a group and have exactly one parent signature, a third-level combinatorial signature CS3. Third-level signatures are grouped in the same way, and this process is continued to the level necessary to encompass all leaf signatures.

This new type of combinatorial signature, when used at the non-leaf levels, saturates more slowly than other techniques, and eliminates more lower level groups resulting in fewer page accesses. Again, note that first-level combinatorial signatures CS1 are only computed and accumulated in higher-level combinatorial signatures using the bit-OR operation—they are not permanently stored. To compute a first-level combinatorial signature (hereinafter referred to as simply a "combinatorial signature") CS1, a leaf signature S1 is computed for each record using a hash algorithm such as Harrison (1971) or other standard method. Techniques for funding the length and hash function for a leaf signature S1 are well-known, as shown by Faloutsos in 1987. For each leaf signature S1, a new larger combinatorial signature CS1 is computed. The combinatorial signature CS1 has more bits than the leaf signature S1, and all of its bits are set to 0. Then, each bit of the combinatorial signature CS1 is set to 1 when all the bits in a specified respective subset of the leaf signature's bits are equal to 1—a logical operation known as bit-ANDing. For each bit of the combinatorial signature CS1, we choose a different subset of bits in S1. To form a second-level parent combinatorial signature CS2 (hereafter a "second-level signature") for a group of leaf signatures S1, all of that group's combinatorial signatures CS1 are superimposed (bit-OR'ed) together.

This signature method can be incorporated into any number of multi-level access structures, including B-trees, AVL-trees, tries, or K-D trees. We describe below a generic organization for constructing multi-level signature files using the most common of these access methods, the B-tree index. Using our method, a single leaf signature S1 is inserted in each leaf index-key entry within the B-tree, and a second-level combinatorial signature CS2 is computed and inserted in each non-leaf B-tree index key entry. The higher-level combinatorial signature entries CS2, CS3, CS4, etc. in the interior (non-leaf) B-tree pages serve to reject entire groups of lower level signatures, while leaf signatures S1 in the leaf pages reject specific data records.

The invention offers several advantages over existing signature methods. When combinatorial signatures are integrated into a B-tree file they require significantly less maintenance than other multi-level signature structures. For normal queries over ranges of index key values, and for searches for exact key values, the index can be used normally. However, when the query contains search terms ("search criteria") other than index key values, the B-tree can be searched using a multi-level signature access method. By performing a pre-order traversal (skipping rejected lower level pages) and testing signatures at the leaf pages, data can be quickly searched and tested for matches with the search criteria. This search method offers much improved performance—typically an order of magnitude better than what is possible using relation scans alone—primarily by greatly reducing false drops caused by combinatorial errors in the signatures.

Detailed Description of the Preferred Embodiment

The preferred embodiment is implemented using components of a conventional database management system (DBMS). It extends the search capabilities of the underlying DBMS by allowing text data to be searched, and provides the DBMS with an alternative to scanning records or using multiple B-tree indexing methods when multiple search terms are 'ANDed' together in a query. First, we describe the hashing method used. Next we present strategies for computing the different signatures. Finally, we describe how the signatures are used with B-trees data structures.

Hash Algorithm

The hash function used in the preferred embodiment provides a means to encode a substring of a record field or text word into a single numeric value within a specified range. The number computed by the hash function identifies a bit position in the leaf signature S1 which is to be set to 1. We use a hash function first described by M. C. Harrison in "Implementation of the Substring Test by Hashing," Communications of the ACM, Vol. 14, No. 21, (December 1971), although other suitable hash functions may also be used.

Signature Generation

Once leaf signatures have been created using this hashing technique, different strategies are possible for determining how its bits are grouped into the sets used to compute the combinatorial signatures CS1. We categorize these strategies as either random or systematic. The number of bits for each group and the total number of groups can be analytically or experimentally varied.

Assume m denotes the length of a leaf signature S1 and cm denotes the length of a combinatorial signature CS1. In the systematic approach, bit-groups are selected from all or part of the $2^m$ possible combinations of bit patterns in S1. The actual length cm of the combinatorial signature CS1 is determined by the number of sets needed from the leaf signature S1.

Using the systematic strategy, we identify all possible pairs of bits in the leaf signature S1. The bits in each of these pairs are bit-ANDed, and each result is mapped to a specific bit position in the combinatorial signature CS1. When this is done systematically, the m bits of the leaf signature S1 form $m-1$ bit partitions in the combinatorial signature CS1. The first partition will be $m-1$ bits long, the second $m-2$ and so on. Bit 1 of the combinatorial signature CS1 is set by bit-ANDing bits 1 and 2 of the leaf signature S1. Bit 2 of CS1 is set by bit-ANDing bits 1 and 3 of S1. This process is continued until all bit-pairs have been encoded.

The total number of bits required for the combinatorial signature CS1 using this systematic method is equal to:

$$(m-1)+(m-2)+(m-3)+\ldots+1$$

or:

$cm = m(m-1)/2$

To illustrate this, assume that each set consists of exactly two bits, and that the leaf signature S1 is 8 bits long (m=8). The combinatorial signature CS1 representing all possible pairs of bits in the leaf signature S1 will be 28 (7+6+5+4+3+2+1) bits long.

We now describe how this scheme works by considering what happens when a query with a combinatorial error is posed. A query signature QS is computed from the fields of the search terms in the same way a leaf signature S1 is computed from the fields of a data record. A combinatorial query signature QCS is then generated from the query signature QS using the same technique used to compute combinatorial signatures CS1 from leaf signatures S1. For a parent combinatorial signature CS2, CS3, etc. to qualify as a candidate, each set bit in combinatorial query signature QCS must correspond to a set bit in the parent signature. Combinatorial signatures CS2, CS3, CS4, etc. which fail this condition can be ignored, and consequently, the entire group of data represented by those signatures can also be ignored. Thus, the combinatorial signature effectively allows us to bypass checking a large number of lower level signatures.

B-Tree Description

We first describe how a B-tree would organize a set of keys and TIDs, and then describe how signature values are created from the record fields. Since text can be treated as a set of variable length record fields, we will not present a separate discussion for text objects. We will describe how computed signatures are added into standard B-tree keys and then how (Key, Signature, TID) entries are inserted, deleted, and searched in the B-tree index structure.

B-trees are commonly found in database systems, and allows records to be easily retrieved by a TID stored with one or more "keys" for each record. A key is a field value (such as a last name) and a TID is a record identifier. (Key, TID) entries are stored in order on pages. The entire set of (Key, TID) entries is always maintained in sorted key order by ordering the leaf pages containing the key entries. The location and range of key values on these leaf pages is maintained by a set of parent (Key, Page-ID) entries stored on parent pages. Pages pointed to by parent pages are called child pages. The parent key for a leaf page is a key value greater than the largest key on the leaf page but less than or equal to the lowest key value of the next leaf page. Parent keys are also sorted and maintained as (Parent-Key, Child-Page-ID) entries in the parent pages. The entries on the parent pages serve to direct the search to the correct leaf page.

When a new (Key, TID) entry is added, the correct leaf page is located and the key is added to that page. If the page has no more space, it is split into two pages. Half of the entries stay on the original page, while the other half move to the second page. Page overflow for parent pages is managed in the same manner as for leaf pages.

Leaf signatures S1 are stored in the B-tree's leaf pages, and combinatorial parent signatures CS2, CS3, etc., are stored in its non-leaf pages. This results in (Key, S1, TID) entries for leaf B-tree pages and (Parent-Key, CS2/CS3/..., Child-Page-ID) entries for non-leaf pages. Combinatorial signatures at the top levels of a B-tree serve to reject or filter out entire subtrees which are not relevant to a query.

Creation of Leaf Signature S1

A leaf signature S1 is formed by setting the indicated bits after the hashing function is applied to field substrings. Field substrings consist of adjoining 3-letter sequences of field values or words in the record. For example, the value "Chang" in field 22 of record 20 of FIG. 8 consists of the 3-letter substring sequences <Cha>, <han>, <ang>.

The Harrison hashing algorithm computes a number based on each 3-letter sequence, by summing weighted values of each character. Case is ignored, and values 0–25 are assigned as follows: a=0, b=1, c=2, ... z=25. The weight $256^0$ is given to the last character of the sequence. The weight $256^1$ is given to the next to the last character, and the weight $256^2$ is given to the first character of each 3-letter sequence. When the character values are weighed and summed, the result is then divided by the largest prime number less than the bit length m of the leaf signature S1. The remainder indicates which bit position in leaf signature S1 is to be set to 1. This process is repeated for all 3-letter substrings to be hashed in the record field. FIG. 2 shows a hash example which is discussed in detail in the Example Section.

The procedure SIG_S1 accepts as input a record, and produces as output a leaf signature S1 of the record. In the procedure, a binary string is first set to all 0s. As each substring of a field of the record is scanned, a bit is selected between the first and last bit position of this string by the hash function, and is set to 1. While hashing, different substrings may cause the same bit to be set to 1. Ideally, the specific hash function should set approximately half of the signature bits to 1.

A pseudocode implementation of procedure SIG_S1 is shown in FIG. 1. The input-data to this procedure is the record or text to be encoded. The output is a new leaf signature S1. Lines 102–106 are initialization steps taken before the scanning process begins. Lines 108–126 form the loop to process all fields in a record. The same hash function is used for all field substrings encountered in line 110. Lines 112–122 form the loop which applies the hash function to each substring in the field. After the hash result is computed (line 114), it is used to set a signature bit in line 118. Line 120 advances the current field to the next field of the record. An implementation in the C programming language of the SIG_S1 procedure is shown in FIG. 17.

The net result of SIG_S1 is to encode the data in the record into a much smaller, more compact representation. Records can be searched more effeciently by testing a properly formed leaf signature S1 than by comparing field values in the record.

Creation of Combinatorial Signatures CS1

We next describe how to create the combinatorial signature CS1 from leaf signature S1. The procedure SIG_CS1 takes as input a leaf signature S1 and computes a combinatorial signature CS1 by examining all possible n-bit groupings in S1. In our implementation n=2, so that pairs of bits are examined. However, larger values may be used, so that triplets, quadruplets, etc. are examined.

The pseudocode implementation of SIG_CS1 shown in FIG. 2 creates an output combinatorial signature CS1 by scanning the bit groups in an input leaf signature S1.

Lines 202-206 initialize the combinatorial signature CS1 and set up the loop for scanning the leaf signature S1. The first DO-UNTIL loop between lines 208-258 process each new bit group in leaf signature S1 beginning with the current S1 bit. The test on line 218 skips an S1 bit position if the bit is off. Line 220 initializes the position pointer for scanning the remaining bits of leaf signature S1 for the current S1 bit position. The actual logical operation(s) on the S1 bits are performed in the inner DO-UNTIL loop between lines 222-240. After each successive S1 bit is compared against the current S1 bit on line 224, an output bit is successively set. Lines 228-234 set the combinatorial signature CS1 bit to the result of the selected logical operation(s).

In the preferred embodiment, the single logical operation of "bit-ANDing" pairs of bits is used to set a combinatorial signature CS1 bit if and only if the two bits in the respective pair of leaf signature S1 bits are both equal to one. Lines 236-238 advance the S1 and CS1 bit position pointers, respectively. The code shown in lines 244-254 is an optimization to skip over the inner DO-UNTIL loop when the starting leaf signature S1 bit in a group is 0. Since the logical operation or "correlation test" consists of bit-ANDing, if any member of the S1 group is 0, the combinatorial signature CS1 bit for that group will also be 0. FIG. 3 shows how a combinatorial signature CS1 is formed from a leaf signature S1, and is discussed in detail in the Example section below. An implementation in the C language of this SIG_CS1 procedure (named SIG_S1B) is shown in FIG. 18.

The process of capturing all correlations between leaf signature S1 bits is the key to this invention. By recording which groups of bits are set on in leaf signature S1, the combinatorial signature CS1 encodes the way in which fields in the original record are correlated to each other. Since no other multi-level signature coding invention to our knowledge does this, other methods fail to reject leaf signatures when presented with any query which consists of values taken from different records in the same group of records, and therefore suffer from severe combinatorial errors.

Creation of Higher Level Combinatorial Signatures

We now describe how parent signatures are created. Up to this point, leaf signatures S1s have been stored and combinatorial signatures CS1s have been computed. In order to use an existing B-tree access method, we will present the necessary procedure to compute the second-level combinatorial signature CS2 for the (Parent-Key, CS2, Leaf Page ID) entries. A second-level combinatorial signature CS2 is created by superimposing or "bit-ORing" individual combinatorial signatures CS1. This procedure will be used repeatedly by other procedures to compute the various second-level, third-level, and higher level signatures CS2, CS3, CS4, etc.

A pseudocode implementation of the SIG_OR procedure is shown in FIG. 3. It superimposes combinatorial signatures CS1 to form a second-level combinatorial signature CS2 (hereafter referred to as simply second-level signature CS2). This procedure is also used to add second-level signatures CS2 into third-level signatures CS3. The input is a combinatorial signature. The output is the computed parent combinatorial signature CS2 (or level i+1) for the next level, based on all of the input combinatorial signatures since the last time the output signature was initialized. The reset flag indicates whether or not to initialize "clear" the output signature.

The output signature is cleared if a new group is to be considered (line 302.) Lines 304-306 initialize the loop for scanning both signatures. The DO-UNTIL loop between lines 308-328 sequentially bit-ORs the first (input) signature into the second (output) signature. Note that by using byte, double byte, or four byte units the processing speed of this loop can be easily increased by factors of 8, 16, or 32, respectively. A C-language implementation of the SIG_OR procedure is shown in FIG. 19.

The SIG_OR procedure allows parent level signatures at any level in the B-tree to be created and updated in one consistent manner. In addition, the bit-OR method of superimposing signatures has the advantage of being very efficient when byte units are used.

Since the logical operation used in the preferred embodiment bit-AND's several bits together, the overall number of bits set in the resulting combinatorial signature (i.e., the ratio of 1's to 0's) is significantly lower than with other signature methods. Because of this, a group of combinatorial signatures CS1 will saturate their parent combinatorial signature much more slowly than when conventional leaf signatures are used to form parent signatures. Eventually, though, when the B-tree has enough levels, the upper level parent combinatorial signatures will saturate. Still, this occurs much more slowly, and at a much higher level than with other signature methods.

The precise rate of saturation for any hierarchical signature system is:

$$\text{parent saturation} = 100 \times (1 - e^{(N \times ln(1 - leaf\ density))})$$

where
N = number of leaf signatures
leaf density = % of total bits set to 1

Recall that a signature saturated to 100% (all 1's) is highly nonselective. For example, if the probability is $\frac{1}{4}$ that a bit in S1 is 1 (called the S1 bit density), and only 8 leaf signatures S1 are placed in a group (N=8), the parent saturation level is 99.99%. However, in comparison, since a combinatorial signature CS1 bit is formed by bit-ANDing leaf signature S1 bits, the probability of a CS1 bit being 1 will be $\frac{1}{4} \times \frac{1}{4}$ or 1/16. The parent saturation level is thus 40.33%, which marks a significant improvement.

Generating Query Signatures

The same signature generation algorithms are used to create both record and query signatures. Thus, the SIG_S1 and SIG_CS1 procedures can be used to compute query signatures. An empty record is used to hold the search values provided in a query. That record is then used as the input to the SIG_S1 routine. The generated leaf signature S1 is termed a query signature QS. This query signature QS is provided to SIG_CS1 to create the combinatarial query signature QCS.

Comparison using combinatorial query signature QCS

We now discuss how query signatures are used. In order to compare a combinatorial query signature QCS against a stored parent second or higher level combinatorial signature CS2, CS3, etc., we use an algorithm for quickly comparing any two signatures. To compare signatures we bit-AND the signatures with each other and compare the resulting bit-string with the original combinatorial query signature QCS. If the two are identical, the query and data signatures match and the child signatures or data represented by the non-query combinatorial signature CS2, CS3, etc. should be individually examined.

A psuedocode implementation of this SIG_AND procedure is shown in FIG. 4. The first input to the procedure is a combinatorial query signature QCS. The second input is a data signature which is any second or higher level combinatorial signature CS2, CS3, CS4, etc.

Query and data signature bits are compared one at a time until all bits are tested. Lines 402–404 initialize the loop and result variables. The DO-UNTIL loop between lines 406–422 processes both signatures bit by bit. Note again that byte, double byte, or four byte units could be used to speed up the bit-ANDing process. The result of the comparison is returned in line 424. The same procedure is used when query signatures QS are compared against leaf signatures S1, the only difference being that leaf signatures S1 are smaller than the combinatorial signatures. A C-language implementation of this procedure (named SIG_COVR in the figure) is shown in FIGS. 20A and 20B. A C-language implementation of a procedure IXM_SRCH used by the SIG_COVR procedure (and by the IXM_LFIN and IXM_LXDE below) is shown in FIGS. 24A and 24B.

B-tree Signature Search Operation

In this section, we present an algorithm for scanning the signatures stored in a B-tree to process a query. This scanning process is used whenever a query containing search terms must be solved.

The SIG_SCAN returns all records which satisfy the search terms of a query. Searching begins on the top or root page of a B-tree index. A combinatorial query signature QCS is generated using the SIG_S1 and SIG_CS1 procedures, and is used to eliminate accesses of non-matching lower level pages (subtrees) within the B-tree. The B-tree is scanned from left to right, visiting lower leaf levels when necessary. This form of tree scanning is also known as a pre-order traversal. The scan algorithm is presented in detail in the pseudocode of FIG. 5. This procedure is called only once, and returns all of the data objects which match the query's search criteria.

The SIG_SCAN procedure of FIG. 5 searches signatures in a B-tree given a query which contains field values, words or substrings connected by Boolean AND operators. The procedure returns all records which produce an exact match. "Root pointer" is the root page of the B-tree index to be searched. Lines 502–504 compute the query signature QS and combinatorial query signature QCS from the provided search terms. The DO-UNTIL loop from line 508 to 572 causes each third-level signature CS3 (root level) entry to be tested. Each third-level signature CS3 is tested against the combinatorial query signature QCS on line 512. Line 514 contains the test used when third-level signature CS3 indicates that the child signature group consisting of second-level signatures CS2 must be searched. In line 516, the B-tree child page associated with Child-Page-ID is retrieved when the signature test of line 514 is successful. Line 534 initializes the scanning of the CS2 signatures.

The DO-UNTIL loop between lines 524–566 contains similar logic to search the next level of signatures. Each second-level signature CS2 is tested on line 528. When this test is successful, the Child-Page-ID associated with that second-level signature CS2 is used to retrieve the leaf B-tree page containing leaf signatures S1. On lines 544–554, if the query's query signature QS matches a leaf signature S1, the corresponding data record is retrieved using the stored TID and is precisely examined using a standard string match algorithm. When query's search criteria are exactly met by values in the record, the record (or TID) is returned. Otherwise the record is a false drop and is ignored. A C-language implementation of the SIG_SCAN procedure is shown in FIGS. 21A–21F.

When queries consist of search terms which are combinations of field values, the combinatorial signatures at the higher levels of the B-tree reject lower level signature groups. This results in a reduction of the signature false drop rate. When this rejection occurs near the root of the B-tree, the entire subtree need not be accessed, resulting in reduced disk accesses and improved search performance.

Inserting Records and Signatures

We now describe how a new (Key, S1, TID) entry is inserted into the B-tree. We do this by presenting a procedure to encode and insert a record object into a B-tree containing signatures. This algorithm is used whenever records in a database table are added or updated.

To insert a (Key, S1, TID) entry, the specified record key field is used to locate the correct leaf page. The entry is inserted, and if there is insufficient room on the B-tree page the page is split. If necessary, splits may propagate to the top level, increasing the total number of levels in the B-tree.

A pseudocode implementation SIG_INSR of this insert process is shown in FIG. 6. The input to SIG_INSR is the record or text to be encoded. TID is a value which is used to retrieve the record, and root pointer is the root page of a B-tree index. When a new record is inserted into the database, the key field(s) of the record are extracted to form a normal B-tree index key (line 602). The leaf signatures S1 and combinatorial signatures CS1 are then computed (lines 604–608). On line 610, a B-tree root-down search is used and existing parent level signatures (e.g., CS3, CS2) along the path to the target leaf page are bit-ORed with the newly computed combinatorial signature CS1. At the leaf level, a leaf page search is performed and the (Key, S1, TID) entry is inserted at the appropriate location if there is enough space (lines 620–622). Line 624 forms the new parent second-level signatures CS2 which will be sent to the parent pages using SIG_CS1.

On line 628, if an out-of-space condition is encountered, a standard B-tree leaf page split operation is started. During this operation a leaf page is physically divided in half and new parent second-level signatures CS2 are computed for the left and right half groups of temporarily computed combinatorial signatures CS1. The (Left-Key, CS2, Left-Child-PageID) entry is then propagated to the original parent page and used to update the old parent entry. The other (Right-Key, CS2, Right-Child-Page-ID) entry is inserted as a new entry on the same parent page. If there is no space on that parent page, a similar splitting operation occurs and new left and right entries are computed and propagated to the next higher level. When there is insufficient space at the root level, a root split causes the B-tree to grow an additional level. A C-language implementation of the SIG_INSR procedure (named IXM_LFIN in the figure) is shown in FIGS. 22A–22K. A C-language implementation of a procedure IXM_SRCH used by IXM_LFIN (and by IXM_LFDE below) is shown in FIGS. 24A and 24B.

This procedure demonstrates how new key data along with associated signatures are inserted into the B-tree. An advantage of our implementation is that by computing parent signatures for a group of signatures on a lower level page, no modification is needed to the basic B-tree space management strategy of splitting pages.

Deleting Records and Signatures

We now describe how records are deleted from the B-tree. Different strategies are possible for handling the deletion of keys. We present the general ideas behind each strategy.

When signatures are used, each deletion of a leaf (Key, S1, TID) entry should be reflected in the parent second-level signature CS2. We can handle a delete using one of two general strategies. A fuzzy delete strategy eliminates leaf entries without necessarily updating higher level parent signatures (causing the false drop rate to increase as more and more tuples are deleted). A deferred "precise" delete strategy causes a group of leaf deletes to modify all affected parents. The particular strategy chosen depends on the frequency and mix of reads and writes to the database, and may be selected and used by a batch-mode maintenance utility run at appropriate intervals. In a normal index, deletes are usually localized to individual leaf pages until the number of elements in a leaf page drop below some threshold (typically half) and a page merge is then attempted. Index deletes normally do not affect parent keys until a page is actually deleted or merged.

A pseudocode implementation of the "fuzzy delete" strategy is shown in FIG. 7. The input to this SIG_DELT procedure is the record or text to be deleted. TID is a value used to uniquely identify the entry in the event of duplicate keys. Pointer is the root page of a B-tree index. The target B-tree entry is constructed in line 702. The location of the full entry to be deleted is determined using a standard B-tree search algorithm (line 724-726). The entry is then deleted on line 728. If it is the last entry, the leaf page is empty and is merged with the next page. The test on line 730 checks for this condition, and if true then at line 738 the old parent entry (Parent-Key, CS2, Child-Page-ID) is deleted. If this parent level page becomes empty, the process is repeated until the root level is reached (line 742). A C-language implementation of the delete process (named IXM_LFDE) is shown in FIGS. 23A-23J.

This delete procedure shows how the B-tree is maintained when entries are deleted. Like the insert procedure, no major changes are required to the basic B-tree space management strategies when signatures are incorporated. This concludes a detailed description of the B-tree implementation of this invention.

Example

To demonstrate the operation of the preferred embodiment, we now consider an example where eight records are to be inserted and queried. As each record is inserted into the database, a B-tree key is formed consisting of a (Key, S1, TID) entry. A leaf signature S1 is generated using the SIG_S1 procedure.

Figures 10, 11:
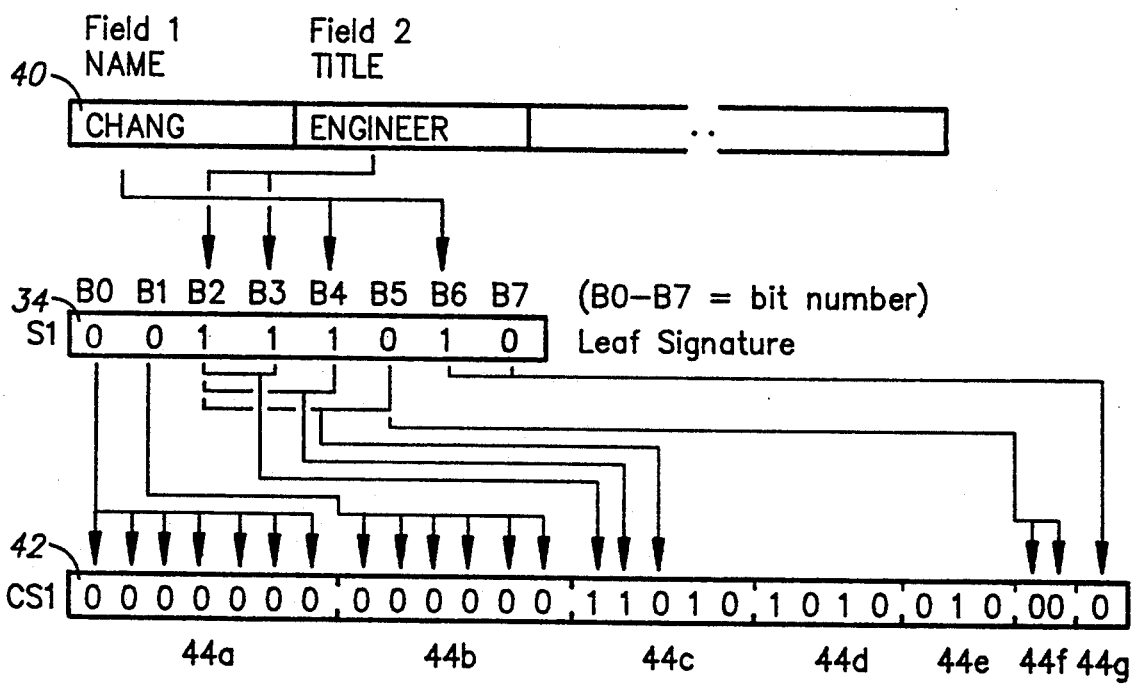
FIG. 10 shows the computation of a combinatorial signature for the record and leaf signature of FIGS. 8 and 9 according to the preferred embodiment.
FIG. 11 shows eight sample data records.

The eight data records are shown in FIG. 11. The first record 40 (Chang, Engineer) is used to form a leaf signature S1 34 as shown in FIG. 2. We begin by hashing the field values. Let $C=2$, $h=7$, $a=0$, $n=13$, and $g=6$. For the first substring <Cha>, when the character values are weighed and added we get a value of 132864. This result is divided by the largest prime number less than the leaf signature S1 bit length, in this case, 7, and the remainder of 4 is used to indicate which bit position in S1 is set to 1. To keep the examples simple, we have shown the result after hashing only the first two 3-letter sequences for each field. In general, we would hash the entire field using this technique.

FIG. 10 shows the computation of the combinatorial signature CS1 42 for the Chang record 40. Each bit except the last one in S1 34 is now paired with its respective remaining bits in S1 to form a group of bits in the combinatorial signature CS1. When this is done, each group of bits 44$a$-$g$ in CS1 42 represents all possible pairs which can be formed between a corresponding S1 bit and all other remaining S1 bits. The bit-AND operation is used to indicate when both bits in the S1 bit pair are 1's. When a bit in leaf signature S1 34 is 0, its entire corresponding bit group 44 in combinatorial signature CS1 42 will be 0.

After the (Key, S1, TID) entry and combinatorial signature CS1 42 are assembled, a standard B-tree search is used to navigate from the root to the correct leaf page. An empty B-tree is a special case, in that the root page is also a leaf page and no parent pages (or signatures) exist yet. Normally, combinatorial signature CS1 42 is bit-ORed with other combinatorial signatures along the descending path to the leaf page. At the leaf level, the (key, S1, TID) entry is inserted.

Now the remaining set of records in FIG. 11 after the Chang record 40 are inserted into the database and B-tree. In practice, records do not have to be inserted in order. Assume that a B-tree leaf page can contain only seven records, as shown in FIG. 12.

As seen in FIG. 13, when the eight entry (Yost, 10110000, TID8) 46 is inserted into the B-tree, the root page is split with half the entries remaining on the top (left) page 48 and the rest moved to the lower (right) page 50. The new entry for Yost 46 is then inserted. However, a parent level needs to be created.

To create the parent level, second-level signatures CS2 52, 54 for the two leaf pages are computed as shown in FIG. 14. The SIG_CS1 procedure is applied to the individual leaf signatures S1 on each leaf page 48, 50. These results are then bit-OR'ed together to form the second-level signatures CS2 52, 54 for their respective leaf pages 48, 50.

As more entries are added to the B-tree, this splitting process continues, creating a new level each time the current top level page is split. FIG. 15 shows a B-tree which has grown to three levels. As described in the text, deletion of keys is the reverse of the insertion process. When a leaf page contains exactly one entry which is deleted, a standard B-tree merge process is performed and the empty page is released.

In FIG. 15, a query consisting of the search terms ("Schek", "Scientist") is applied to the three-level B-tree. Using SIG_S1, a query signature Q 55 is created, and from it a combinatorial query signature QCS 56 is created. The root page 58 of the B-tree is first accessed. Combinatorial query signature QCS 56 is then compared against each root page entry. The SIG_AND compare procedure would indicate that the QCS 56 and the first third-level signature CS3 60 are a match. The child-page pointer (PTR) field of that root page entry is used to locate its child page 62, and combinatorial query signature QCS 56 is then compared against the second-level combinatorial signature CS2 of each entry on the child page. Recall that the signature test is satisfied only when there is a 1 bit in the data signature corresponding to each 1 bit in the query signature. All of the 1's in combinatorial query signature QCS 56 have corresponding 1's in the second-level signature CS2 64 of the first entry of the child page 62 except at position 7 (counting from 0). That entry is thus rejected, and its lower level leaf page 66 is not accessed.

When combinatorial query signature QCS 56 is compared to the second-level signature CS2 64 of the second entry on the child page 62, all of the 1's in QCS 56 have corresponding 1's. The leaf child page 68 is then accessed using the PTR valve, and the shorter query signature QS 55 is compared against the leaf signature S1 34 of each entry on the leaf child page 68. Only the leaf signature S1 34 for the second entry contains 1's in all positions in which there are 1's in query signature QS 55. The TID field (TID6) in that entry is then used to retrieve the associated record, and an exact string compare is made between the search terms in the query and the field values in the retrieved record. Since this is the correct record, it is returned to the user.

The next query we consider is one that contains a combinatorial error. In FIG. 15, the second query consists of the search terms "Chang" and "Scientist", a combination which does not exist in the actual data, but which would appear to exist as a virtual record using non-combinatorial parent signatures. First, the query signature QS 70 is computed for the query. Then combinatorial query signature QCS 72 is computed and compared against each entry of the root page 58. Since combinatorial query signature QCS 72 contains 1's at positions 22 and 25 and the third-level signature CS3 60 of the root page's first entry does not, all the lower level pages associated with that entry can be rejected. Similarly, since the combinatorial query signature QCS 72 contains 1's at positions 20, 22, 23, and 25, and the third-level signature CS3 of the root page's second entry does not, all the lower level pages associated with that entry can be rejected as well. This correctly reflects that the combination ("Chang", "Scientist") does not exist.

Figure 16:
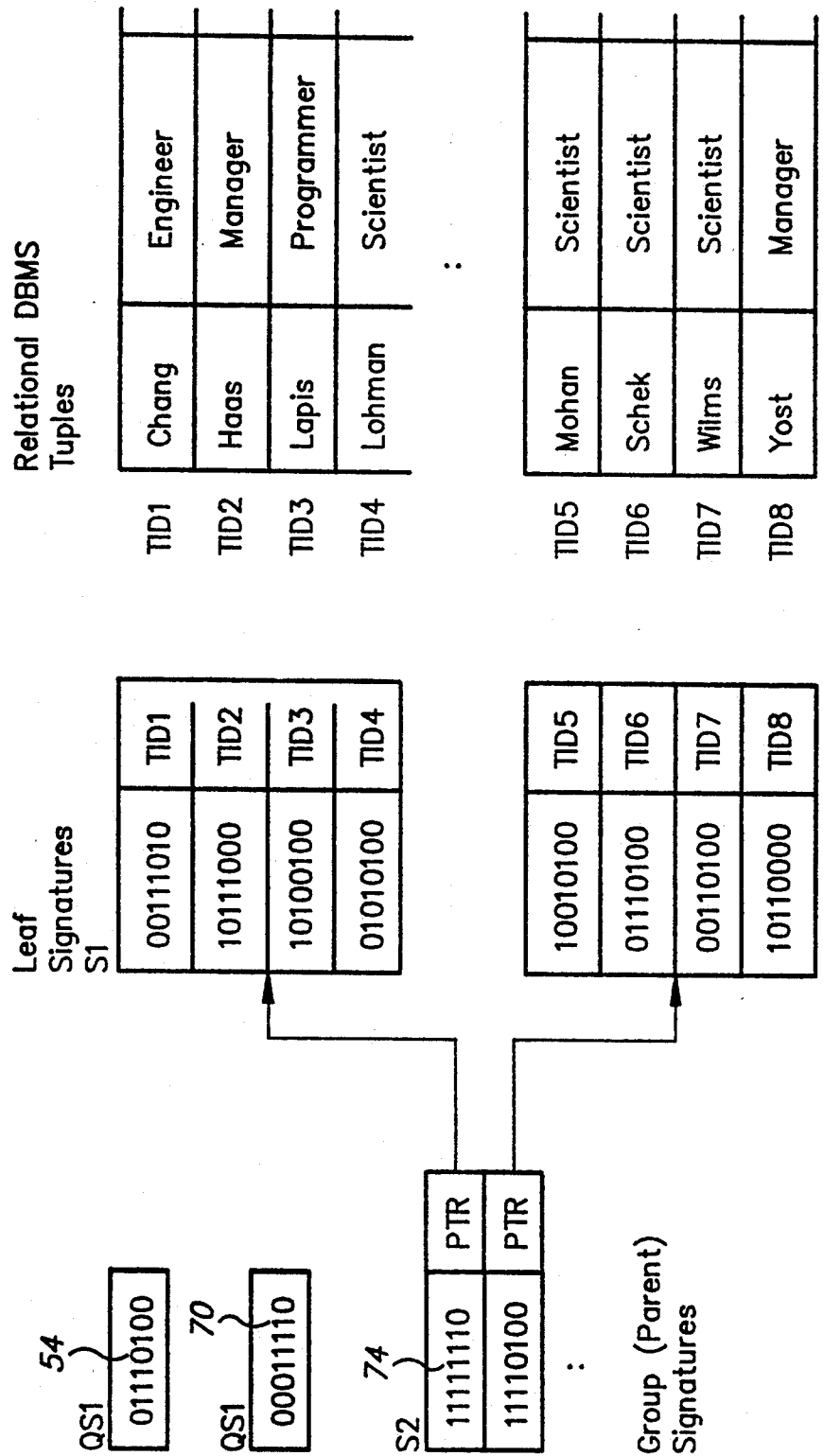
FIG. 16 shows a two-level non-combinatorial signature B-tree according to the prior art, containing the data of FIG. 15.

For comparison, assume that we had used non-combinatorial leaf signatures S1 to construct a two-level signature file, as shown in FIG. 16. Here second-level non-combinatorial signatures 74 are stored for the entries at the root page. Using the same queries as in the example above, we will show that the number of page access is much higher, and consequently the overall performance is much worse, when non-combinatorial signatures are used.

To process the first query (NAME="Schek", TITLE="Scientist"), the query signature QS 55 is computed and compared against each entry of the root page. After being tested against the non-combinatorial second-level signature S2 74 of the root page's first entry, a match is indicated and the child page associated with that entry is retrieved. Query signature QS 55 is then compared against each entry on the child page. Since none match, all entries on that child page are signature false drops, and the access of that page was unnecessary. When query signature QS 55 is compared against the non-combinatorial second-level signature S2 of the second entry of the root page, another match is indicated and the respective child page is retrieved. After comparing query signature QS 55 against the leaf signatures S1s of that page's entries, only one contains a match. Thus, to solve this query every leaf signature S1 was examined.

In the case of the query containing the combinatorial error (NAME="Chang", TITLE="Scientist"), when the query signature QS 70 is used in the two-level signature B-tree of FIG. 16, the non-combinatorial second-level signature S2 74 of the root page's first entry results in a match with the query signature QS. The corresponding child page is then accessed and all leaf signatures S1s are tested, although none result in a match. The QS does not match the non-combinatorial second-level signature S2 of the second entry on the root page, so that entry's corresponding child page is skipped. When we compare this query with the equivalent two-level combinatorial approach shown in FIG. 14 and discussed above, we see that combinatorial signatures result in a significant improvement in performance.

It will be appreciated that, although a specific embodiment of the invention has been described above for purposes of illustration, various modifications may be made without departing from the spirit and scope of the invention. In particular, alternative encoding methods are possible to generate the leaf signatures S1, such as by using different hash functions, or by varying the length of the letter substrings which are encoded. In addition, the combinatorial signature CS1 may also be computed from the leaf signature S1 other than by using the simple logical intersection (AND) of pairs of S1 bits. For example, larger sets of S1 bits (triplet's, quadruplets, etc.) could be used instead of considering only bit pairs. Further, more complex logical computations might replace the single logical operation (AND) described above. Such signatures would be useful for queries which are more complex than the simple ones used in the example and embodiment discussed herein. Finally, it will be understood that it is not necessary to use the same logical operation on all sets of S1 bits, or to require each set of S1 bits to have the same number of members. The choices of hashing method, set size and membership, and logical operations to be performed on the sets must be made in light of the types of queries most likely to be presented.

An alternative to selecting sets of bits in S1 is to always use a preselected random set of bits for each bit in CS1. In the random approach, one would first predetermine the number of S1 bit-groups to be used (typically equal to the number of bits in the combinatorial signature CS1 and then randomly select bits from leaf signature S1 to form a set of S1 bits corresponding to each bit in combinatorial signature CS1. Then, using the single logical operation AND, if all bits in the set are equal to one, set the result equal to one, otherwise set the result equal to zero. Finally, set the corresponding bit in CS1 equal to the result of the logical operation(s). Once the random leaf signature S1 bit sets have been assigned for each combinatorial signature CS1 bit, those assigned selections should be used without change.

Finally, the invention may be used with a variety of data structures. While the preferred embodiment uses a B-tree, in general any hierarchical data structure may be used. This includes normal binary trees, "AVL trees", "trie" structures, and "K-D trees". In the case of B-trees, a variety of fuzzy or deletion strategies are possible for maintaining good signature performance in the B-tree. One variation on the fuzzy delete technique described above is a deferred strategy which periodically recomputes the necessary signatures in the upper levels of the B-tree. This method is straightforward and can be implemented by modifying a standard batch-mode index build utility.

Accordingly, the scope of protection of this invention is limited only by the following claims.

We claim:

1. For use with a data processing and storage system, in which data is stored in records, the system including a processor and data storage means, a method for searching for a record in said data storage means using an encoded signature representing one of the stored records having at least two data items, each data item including a plurality of bits, the method comprising the steps, executed by the processor, of:

(a) computing a base signature, the base signature including a plurality of base signature bits, using at least two data items of the one of the records;

(b) allocating said base signature bits of said base signature into a plurality of respective base signature bit sets; and (c) computing values for respective bits of a combinatorial signature, the respective bits corresponding with the respective base signature bit sets, the value of each respective bit being computed based on a logical operation on of the bits of the corresponding one of the respective base signature bit sets;

(d) searching for a record in said storage means, the record corresponding with said combinatorial signature, the step of searching using said combinatorial signature;

(e) retrieving the record.

2. The method of claim 1, wherein step (a) includes hashing the two or more data items represented by the base signature.

3. The method of claim 2, further comprising the step of initially clearing the combinatorial signature; and wherein step (c) includes setting each bit of the combinatorial signature equal to one only if all of the bits of the respective base signature bit set are equal to one.

4. The method of claim 1, wherein step (b) includes assigning values based on the logical intersection (AND) of the bits of the respective sets.

5. The method of claim 1, wherein:

the combinatorial signature is a first combinatorial signature; and the method further comprises the steps of:

(d) repeating steps (a) to (c) to create a second combinatorial signature for a second record and a second level combinatorial signature, said second combinatorial signature including respective bits which correspond with respective base signature bit sets allocated from base signature bits of a base signature for the second record, said second level combinatorial signature including respective bits, the respective bits corresponding with the bits of the first and second combinatorial signatures; and (e) computing a value for each bit of the second level combinatorial signature based on a logical operation on said corresponding bits of the first and second combinatorial signature.

6. The method of claim 5 wherein:

the method further comprises the step of initially clearing the first and second combinatorial signatures;

said logic operation in step (c) includes an ANDing operation which sets each bit of said first and said second combinatorial signatures equal to one only if all of the bits of the respective base signature bit set are equal to one; and said logic operation in step (e) includes an ORing operation which sets each bit of the second-level combinatorial signature equal to the logical union (OR) of said corresponding bits of said first and second combinatorial signatures.

7. A database system comprising:

means for storing a plurality of data pages, each data page including a plurality of data records, each data record including a plurality of data items, each data item having a plurality of bits;

means for storing a plurality of leaf pages, each leafpage having a pointer and a plurality of memory stores, each of said pointers pointing to a corresponding data page, each of said memory stores including means for storing a combinatorial signature; a database management system including means for generating a plurality of multilevel combinatorial signatures, the means for generating including:

(a) means for computing a base signature, the base signature comprising a plurality of base signature bits, representing a first record;

(b) means for allocating said base-signature bits of said base signature into a plurality of respective base signature bit sets;

(c) means for computing values for respective bits of a first combinatorial signature, the respective bits corresponding with the respective base signature bit sets, the value of each respective bit being computed based on a logical operation on the bits of the corresponding one of the respective base signature bit sets;

(d) means for repeating steps (a) to (c) to create a second combinatorial signature for a second record, said second combinatorial signature including respective bits, the respective bits corresponding with respective base signature bit sets allocated from base signature bits of a base signature for the second record; and (e) means for creating a second level combinatorial signature including respective bits, the respective bits of the second combinatorial signature respectively corresponding with respective bits of the first and second combinatorial signatures, by computing a value for each respective bit of the second level combinational signature based on a logical operation on said corresponding bits of the first and the second combinatorial signatures;

the database management system further including means for receiving an inquired data item and for computing an inquiry signature for said inquired data item, the inquiry signature having bit values related to the bit values of the base signature bits of the inquired data item; and means for comparing said inquiry signature with said second level and said first and said second combinatorial signatures to determine, by finding a match between the inquiry signature and one of the combinatorial signatures, whether said inquired data item is within one of the data records whose base signatures were used by the means for generating to generate the one of the combinatorial signatures, based on the relation of the combinatorial signatures and the base signatures of the data records.

8. The data base system of claim 7, wherein:

the database management system further includes:

means for generating a plurality of second-level combinatorial signatures, one for each of said data pages; and means for comparing each of said inquiry signatures to each of said second-level combinatorial signatures to determine a plurality of data page and data record addresses.

9. A database system comprising:

means for storing a plurality of data pages, each data page including a plurality of data records, each data record including a plurality of data items, each data item having a plurality of bits;

means for storing a plurality of leaf pages, each one of the leaf pages having a pointer and a plurality of memory stores, each of said pointers pointing to a corresponding one of the data pages;

a database management system including means for generating a plurality of combinatorial signatures, the means for generating including;

(a) means for computing base signatures for each of the data records of the data pages stored by the means for storing, each base signature comprising a plurality of base signature bits, representing one of the plurality of data records of one of the plurality of data pages;

(b) means for allocating said base-signature bits of said base signature into a plurality of respective base signature bit sets;

(c) means for computing values for respective bits of a combinatorial signature, the respective bits corresponding with the respective base signature bit sets, the value of each respective bit being computed based on a logical operation on the bits of the corresponding one of the respective base signature bit sets, thereby causing the combinatorial signature to have a relation to the base signature;

the database management system further including means for receiving an inquired data item and for computing an inquiry signature for said inquired data item, the inquiry signature having bit values related to the bit values of the base signature bits of the inquired data item; and means for comparing said inquiry signature with combinatorial signatures generated by the means for generating, to determine, by finding a match between the inquiry signature and one of the combinatorial signatures, whether said inquired data item is within one of the data records whose base signatures were used by the means for generating to generate the one of the combinatorial signatures, based on the relation of the combinatorial signatures and the base signatures of the data records.

* * * * *

UNITED STATES PATENT AND TRADEMARK OFFICE
CERTIFICATE OF CORRECTION

PATENT NO. : 5,319,779

DATED : Jun. 7, 1994

INVENTOR(S) : W. W. Chang and H. G. Schek

It is certified that error appears in the above-identified patent and that said Letters Patent is hereby corrected as shown below: Title page, item (56): Other Publication;

Prior art references omitted from the front face of the issued patent.

Roberts, Partial Match Retrieval Via the Method of Super-Imposed Codes, Proceedings of the IEEE, Vol. 67, No. 12, December 1979, p. 1624-1642.

Pfaltz et al., Partial Match Retrieval Using Indexed Descriptor Files, Communications of the ACM, Sept. 1980, Vol. 23, No. 9, p. 522-528.

Deppisch, S-Tree: A Dynamic Balanced Signature Index for Office Retrieval, Proceedings of the 1986 ACM Conference, Sept. 8-10, 1986.

Harrison, Implementation of the Substring Test by Hashing, Communications of the ACM, Vol. 14, No. 12, December 1971, p. 777-779.

King et al., Design of a Document Filing and Retrieval Service, IBM Research Report, November 1982.

Dadam et al., A Predicate Oriented Locking Approach for Integrated Information Systems, Information Processing 83, Sept. 19-23, 1983.

Goyal, Coding Methods for Test String Search on Compressed Databases, Information Systems, Vol. 8, No. 3, p. 231-233, 1983.

Faloutsos et al., Optical Signature Extraction and Information Loss, ACM Transactions on Database Systems, Vol. 12, No. 3, Sept. 1987, p. 395-428.

UNITED STATES PATENT AND TRADEMARK OFFICE
CERTIFICATE OF CORRECTION

PATENT NO. : 5,319,779

DATED : Jun. 7, 1994

INVENTOR(S) : W. W. Chang and H. G. Schek

It is certified that error appears in the above-identified patent and that said Letters Patent is hereby corrected as shown below:

Prior art references omitted from the front face of the issued patent.

Christodoulakis et al., Design Considerations for Message File Server, IEEE Transactions on Software Engineering, Vol. SE-10, No. 2 March 1984, p. 201-2.

Faloutsos, Signature Files: Design and Performance Comparison of Some Signature Extraction Methods, ACM 1985, p. 63-82.

Faloutsos, Design of a Signature File Method that Accounts for Non-Uniform Occurrence and Query Frequencies, Proceedings of VLDB 85, p. 165-170.

Sacks-Davis et al., A Two Level Superimposed Coding Scheme for Partial Match Retrieval Information Systems, Vol. 8, No. 4, p. 273-260, 1983.

Schek, The Reference String Indexing Method, Information Methodology, Vol. 65, 1978, p. 432-459.

Signed and Sealed this

Twentieth Day of September, 1994

*Attest:*

BRUCE LEHMAN

*Attesting Officer*   *Commissioner of Patents and Trademarks*